US012809543B2

(12) United States Patent
Vijayan et al.

(10) Patent No.: US 12,809,543 B2
(45) Date of Patent: Nov. 24, 2026

(54) ENHANCING HIGH-AVAILABILITY IN MEDIATOR-LESS DEPLOYMENTS IN A DISTRIBUTED STORAGE SYSTEM

(71) Applicant: NetApp, Inc., San Jose, CA (US)

(72) Inventors: Anoop Vijayan, Bangalore (IN); Sohan Shetty, Bangalore (IN); Akhil Kaushik, San Jose, CA (US); Rohit Chaudhary, Uttar Pradesh (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 19/034,398

(22) Filed: Jan. 22, 2025

(65) Prior Publication Data

US 2025/0173084 A1 May 29, 2025

Related U.S. Application Data

(63) Continuation-in-part of application No. 18/296,832, filed on Apr. 6, 2023, now Pat. No. 12,436,852.

(51) Int. Cl.
*G06F 3/00* (2006.01)
*G06F 3/06* (2006.01)

(52) U.S. Cl.
CPC ............ *G06F 3/065* (2013.01); *G06F 3/0604* (2013.01); *G06F 3/067* (2013.01)

(58) Field of Classification Search
CPC ......... G06F 3/065; G06F 3/0604; G06F 3/067
See application file for complete search history.

(56) References Cited

U.S. PATENT DOCUMENTS 5,742,792 A 4/1998 Yanai et al.
5,933,849 A 8/1999 Srbljic et al.
5,961,590 A 10/1999 Mendez et al.
6,115,027 A 9/2000 Hao et al.
(Continued)

OTHER PUBLICATIONS

DEFINITION Race Condition; Ben Lutkevich; TechTarget; Jun. 2021; Retrieved from https://www.techtarget.com/searchstorage/definition/race-condition on Jun. 26, 2024 (Year: 2021), pp. 1-6.
(Continued)

*Primary Examiner* — Craig S Goldschmidt
(74) *Attorney, Agent, or Firm* — Jaffery Watson Hamilton & DeSanctis LLP

(57) ABSTRACT

Systems and methods include negotiating a primary bias state for primary and secondary storage sites for a mediator-less deployment. In one example, a computer-implemented method comprises detecting whether an active synchronous replication relationship is created for bi-directional synchronous replication between a first consistency group (CG1) of one or more storage members of the primary storage site and a second consistency group (CG2) of one or more storage members of the secondary storage site when a mediator is not configured for a mediator-less deployment or whether an existing mediator is being unconfigured with the mediator located remotely from the primary storage site and remotely from the secondary storage site, and negotiating a primary bias state and setting the primary bias state on a secondary storage cluster of the secondary storage site upon the active synchronous replication relationship being created with no configured mediator or when the existing mediator is unconfigured.

20 Claims, 25 Drawing Sheets

(56) References Cited

U.S. PATENT DOCUMENTS

| | | | |
|---|---|---|---|
| 6,154,811 A | 11/2000 | Srbljic et al. | |
| 8,234,518 B2 | 7/2012 | Hansen | |
| 10,051,052 B2 | 8/2018 | Darcy | |
| 10,686,879 B2 | 6/2020 | Darcy | |
| 11,409,622 B1 * | 8/2022 | Kaushik | G06F 11/2069 |
| 12,436,852 B2 | 10/2025 | Shetty et al. | |
| 12,554,432 B2 | 2/2026 | Shetty et al. | |
| 2012/0197822 A1 | 8/2012 | Lee et al. | |
| 2014/0047263 A1 * | 2/2014 | Coatney | G06F 11/2092 711/119 |
| 2014/0129521 A1 | 5/2014 | Marsden | |
| 2018/0074915 A1 | 3/2018 | Yang et al. | |
| 2020/0034258 A1 | 1/2020 | Avraham et al. | |
| 2021/0026566 A1 | 1/2021 | Suzuki et al. | |
| 2022/0237594 A1 | 7/2022 | Carver et al. | |
| 2022/0318104 A1 * | 10/2022 | Bhargava | G06F 11/2069 |
| 2022/0318107 A1 | 10/2022 | Kaushik et al. | |
| 2022/0357854 A1 | 11/2022 | Narasingarayanapeta | |
| 2023/0104473 A1 * | 4/2023 | Nazari | H04L 1/1614 711/154 |
| 2023/0350753 A1 | 11/2023 | Kurata et al. | |
| 2024/0220378 A1 | 7/2024 | Ohira et al. | |
| 2024/0338125 A1 | 10/2024 | Shetty et al. | |
| 2024/0338145 A1 | 10/2024 | Shetty et al. | |
| 2026/0017159 A1 | 1/2026 | Shetty et al. | |
| 2026/0169653 A1 | 6/2026 | Shetty et al. | |

OTHER PUBLICATIONS

Final Office Action mailed on Nov. 21, 2024 for U.S. Appl. No. 18/296,834, filed Apr. 6, 2023, 30 pages.

GIGABYTE., "Cluster Computing: an Advanced Form of Distributed Computing," Insight, 2022, pp. 1-16.

Moraru I., et al., "Paxos Quorum Leases: Fast Reads Without Sacrificing Writes," SOCC '14, 2014, pp. 1-13.

Non-Final Office Action mailed on Jul. 2, 2024 for U.S. Appl. No. 18/296,834, filed Apr. 6, 2023, 26 pages.

Non-Final Office Action mailed on Nov. 27, 2024 for U.S. Appl. No. 18/296,832, filed Apr. 6, 2023, 24 pages.

PASCHAL., "Understand Master-Slave Relationships using the Election Algorithm," DEV Community, Aug. 9, 2019, pp. 1-13.

Purity ActiveCluster; Pure Storage; May 2022; retrieved from https://www.purestorage.com/content/dam/pdf/en/datasheets/ds-purity-activecluster.pdf on Jun. 26, 2024 (Year: 2022), pp. 1-2.

Purity ActiveCluster: Simple Stretch Clustering for All; Larry Touchette; Jun. 14, 2017; retrieved from https://blog.purestorage.com/products/activecluster-simple-stretch-clustering/ on Jun. 26, 2024 (Year: 2017), pp. 1-12.

Stack-Xchange NPL., "In a Master-slave Replication Mechanism, How Do You Avoid/cope With the Fact That the Master is a Single Point of Failure? Is There a Solution?," Software Engineering, 2016, 02 pages.

The Wayback machine., "About replication in Cloud SQL," Cloud SQL, Retrieved on Oct. 16, 2022, pp. 1-13.

The Wayback Machine., "Data Residency Overview," Google Cloud, Retrieved on 2022, pp. 1-6.

Vmware., "ActiveCluster VMware vMSC (51656)," Vmware Knowledge Base, Last Updated: Jun. 8, 2020. Retrieved from Internet : URL: https://kb.vmware.com/s/article/51656.

WIKIPEDIA., "High-availability Cluster," Wikipedia: The Free Encyclopedia, Retrieved on 2022, pp. 1-5.

Downing A.R., et al., "OSCAR: An Architecture for Weak-consistency Replication," Proceedings PARBASE-90: International Conference on Databases, Parallel Architectures, and Their Applications, Miami Beach, FL, USA, 1990, pp. 350-358.

Non Final Office Action mailed on May 22, 2025 for U.S. Appl. No. 18/296,834, filed Apr. 6, 2023, 34 pages.

Notice of Allowance mailed on May 22, 2025 for U.S. Appl. No. 18/296,832, filed Apr. 6, 2023, 10 pages.

Non-Final Office Action mailed on Jun. 16, 2026 for U.S. Appl. No. 19/336,000, filed Sep. 22, 2025, 23 pages.

Corrected Notice of Allowance mailed on Sep. 10, 2025 for U.S. Appl. No. 18/296,832, filed Apr. 6, 2023, 02 pages.

Notice of Allowance mailed on Oct. 16, 2025 for U.S. Appl. No. 18/296,834, filed Apr. 6, 2023, 10 pages.

Supplemental Notice of Allowance mailed on Oct. 29, 2025 for U.S. Appl. No. 18/296,834, filed Apr. 6, 2023, 02 pages.

* cited by examiner

ENHANCING HIGH-AVAILABILITY IN MEDIATOR-LESS DEPLOYMENTS IN A DISTRIBUTED STORAGE SYSTEM

RELATED APPLICATIONS

This application is a continuation-in-part of U.S. patent application Ser. No. 18/296,832, filed Apr. 6, 2023, which is each hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2023-2025 NetApp, Inc.

FIELD

Various embodiments of the present disclosure generally relate to multi-site data storage systems. In particular, some embodiments relate to enhancing high-availability in a mediator-less deployment in a multi-site data storage system.

BACKGROUND

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

Business enterprises rely on multiple clusters for storing and retrieving data. Each cluster may be a separate data center with the clusters able to communicate over an unreliable network. The network can be prone to failures leading to connectivity issues such as transient or persistent connectivity issues that disrupt operations of a business enterprise.

SUMMARY

Systems and methods are described for negotiating a primary bias state for primary and secondary storage sites when a mediator is temporarily unavailable for a multi-site distributed data storage system. According to an example, a computer-implemented method is executed by one or more processors of the multi-site distributed storage system. The computer-implemented method comprising detecting, with the primary storage site having a primary storage cluster, a temporary loss of connectivity to a mediator or a temporary failure of the mediator that is located remotely from the primary storage site. The computer-implemented method includes negotiating the primary bias state and setting the primary bias state on a secondary storage cluster of the secondary storage site when the secondary storage cluster detects a temporary loss of connectivity to the mediator, and determining whether the primary storage cluster receives a confirmation of the secondary storage cluster setting the primary bias state. The computer-implemented method further includes setting the primary bias state on the primary storage cluster when the primary storage cluster receives the confirmation.

In one example, a computer-implemented method for a negotiation process handles race conditions for a first process to set a primary bias state and a second process to clear the primary bias state with one or more processors of a multi-site distributed storage system. The computer-implemented method comprises initiating the first process for atomically setting the primary bias state with a first node of a primary storage cluster of the multi-site distributed storage system due to a temporary loss of connectivity to a mediator or a temporary mediator failure, releasing an atomic lock for the first process on the first node of the primary storage cluster, sending the first process and an associated first generation indicator to a first node of a secondary storage cluster of the multi-site distributed storage system to handle the first process for setting the primary bias state, and initiating a second process for atomically clearing a primary bias state with the first node or any node of the primary storage cluster based on detecting a connection to the mediator or detecting that the mediator is available.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 15, 16A, 16B, 16C, 17A, 17B, and 17C illustrate computer-implemented methods of a negotiation process to handle race conditions for a first process to set a primary bias state and a second process to clear the primary bias state of a primary storage cluster based on a mediator-less deployment or changing from unconfigurable mediator to configurable mediator in accordance with one embodiment.

DETAILED DESCRIPTION

Figure 1:
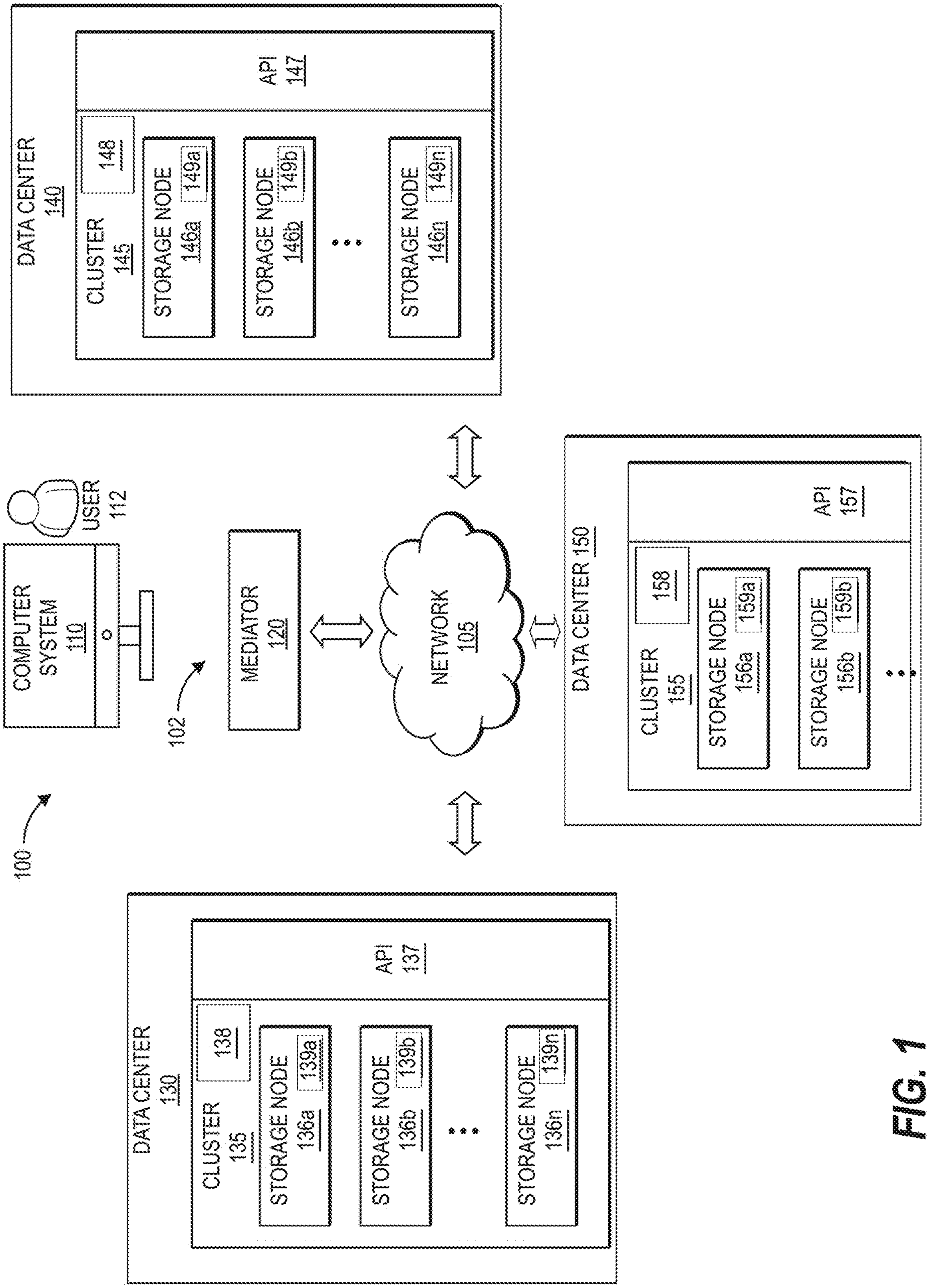
FIG. 1 is a block diagram illustrating an environment in which various embodiments may be implemented.

Multi-site distributed storage systems and computer-implemented methods are described for providing a primary bias feature to guarantee non-disruptive operations (e.g., operations of business enterprise applications, operations of software applications) in the presence of failures including, but not limited to, temporary network disconnection between storage sites and a mediator, temporary failure of the mediator, temporary network disconnection between storage sites, and temporary failure of one or more storage sites. An order of operations performed by a planned failover or unplanned failover includes a timing window where both a primary copy of a first data center and a mirror copy of a second data center are designated with a role of a leader and therefore are capable of serving input/output (I/O) operations (e.g., I/O commands) to an application independently. However, if multiple data centers are simultaneously allowed to serve I/O operations, then this cause a split-brain situation and results in data consistency issues.

In a cross-site high availability distributed storage system, any disruption event is resolved by an external mediator that determines which storage site (e.g., primary storage site, secondary storage site, tertiary storage site) will serve data for I/O operations. If the external mediator is unavailable or unreachable, then this can impact the availability of data for an application if a disruption event occurs.

This primary bias feature of a multi-site distributed storage system is pre-negotiated for one storage site. If an external mediator becomes temporarily unreachable from two or more storage sites, the storage clusters of the storage sites involved in a mirroring data replication relationship will negotiate and agree to work in a primary bias mode. In this mode, the primary I/O serving role is anchored at the storage cluster which at the time is configured as the source/primary endpoint of a consistency group. Planned or unplanned failover that causes switching of roles is prevented in this primary bias mode. Any disruption event that normally requires mediation between the endpoints while in this state is resolved by granting consensus to the anchored endpoint. The mediator or communication from the mediator to the storage site is not required in this case for the resolution as a primary bias state is stored locally on each storage cluster.

In one example, the primary storage site and secondary storage site are located in relatively close proximity (e.g., less than 100 km, proximity based on round trip time guarantees for synchronous replication datasets) and the tertiary storage site is located at a greater distance. In another example, one or more of the storage sites (e.g., one storage site, two storage sites, three storage sites) can be located in a private or public cloud, accessible (e.g., via a web portal) to an administrator associated with a managed service provider and/or administrators of one or more customers of the managed service provider, includes a cloud-based, monitoring system provided that network connectivity is suitable for synchronous replication between the two synchronous replicated copies. Furthermore, other combinations for the storage sites are included in this present design, for example, one storage site on premise and two storage sites in the cloud and other such variants. The three site topology is applicable to cloud-resident workloads and datasets as well. For a fully cloud resident dataset, two sites can be in the same region (e.g., same availability zone (AZ) or different AZs with sync replication being a limit to a distance between the two sites) and the third site can be in a different region (e.g., a long distance dataset copy) or even an on premise data center. Availability zones (AZs) are isolated data centers located within specific regions in which public cloud services originate and operate. Cloud computing businesses typically have multiple worldwide availability zones. A cloud-resident workload is an application, service, capability, or a specified amount of work that consumes cloud-based resources (e.g., computing or memory power). Databases, containers, microservices, VMs, and Hadoop nodes are examples of cloud workloads.

Any quorum based system would benefit from methods and distributed storage systems of the present disclosure. This present design is novel and can be extended to apply to solve the split brain problem for a cluster of multiple nodes or a distributed storage system with more than 2 copies. The methods of the present disclosure can be combined with existing quorum consensus algorithms that are limited to local data centers (DC) and therefore can be applied to solve a problem for stretched/distributed datacenter clusters.

In one embodiment, cross-site high availability is a valuable addition to cross-site zero recover point objective (RPO) that provides non-disruptive operations even if an entire local data center becomes non-functional based on a seamless failing over of storage access to a mirror copy hosted in a remote data center. This type of failover is also known as zero RTO, near zero RTO, or automatic failover. A cross-site high availability storage when deployed with host clustering enables workloads to be in both data centers.

A planned failover of storage access from a primary copy of the dataset to a cross-site mirror copy is desired due to business process requirements to prove that the mirror copy actually works in case of a real disaster and also as a general practice to periodically switch the primary and mirror data centers.

A planned failover is desired for a distributed high availability storage system. The planned failover can also be used for non-disruptive migration of workloads in a planned fashion. Given that more workloads are moving to a cloud environment and many customers deploy hybrid cloud, applications will also demand these same features in the cloud including cross-site high availability, planned failover, planned migration, etc.

As such, embodiments described herein seek to improve the technological processes of multi-site distributed data storage systems. Various embodiments of the present technology provide for a wide range of technical effects, advantages, and/or improvements to multi-site distributed storage systems and components. For example, various embodiments may include one or more of the following technical effects, advantages, and/or improvements. A negotiation for the primary bias state is a two step process. The primary site has to first get an agreement from the secondary site that the secondary site will not participate in a failover event during and after the negotiation. This enables the primary site to safely assume authority to enter the primary bias state, and the negotiation process handles the races with the connection state changes between a mediator and the primary storage site or between the mediator and a secondary storage site. This is achieved through a replicated database serialization and use of generation indicator to drop stale event flows.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135, 145, and optional cluster 155 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, an optional data center 150, and optionally a mediator 120. The data centers 130, 140, 150, the mediator 120, and the computer system 110 are coupled in communication via a network 105, which, depending upon the particular implementation, may be a Local Area Network (LAN), a Wide Area Network (WAN), or the Internet.

The data centers 130, 140, and 150 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130, 140, and 150 may represent a colocation data center in which a company rents space of a facility owned by others and located off the company premises. The data centers are shown with a cluster (e.g., cluster 135, cluster 145, cluster 155). Those of ordinary skill in the art will appreciate additional IT infrastructure may be included within the data centers 130, 140, and 150. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center. The cluster 155 of optional data center 150 can have an asynchronous relationship, synchronous relationship, or be a vault retention of the cluster 135 of the data center 130.

Turning now to the cluster 135, it includes a configuration database 138, multiple storage nodes 136*a-n* each having a respective mediator agent 139*a-n*, and an Application Programming Interface (API) 137. In the context of the present example, the multiple storage nodes 136*a-n* are organized as a cluster and provide a distributed storage architecture to service storage requests issued by one or more clients (not shown) of the cluster. The configuration database may store configuration information for a cluster. A configuration database provides cluster wide storage for storage nodes within a cluster. The data served by the storage nodes 136*a-n* may be distributed across multiple storage units embodied as persistent storage devices, including but not limited to HDDs, SSDs, flash memory systems, or other storage devices. In a similar manner, cluster 145 includes a configuration database 148, multiple storage nodes 146*a-n* each having a respective mediator agent 149*a-n*, and an Application Programming Interface (API) 147. In the context of the present example, the multiple storage nodes 146*a-n* are organized as a cluster and provide a distributed storage architecture to service storage requests issued by one or more clients of the cluster. Turning now to the optional cluster 155, it includes a configuration database 158, multiple storage nodes 156*a-b* each having a respective mediator agent 159*a-b*, and an Application Programming Interface (API) 157.

The API 137 may provide an interface through which the cluster 135 is configured and/or queried by external actors (e.g., computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only three data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
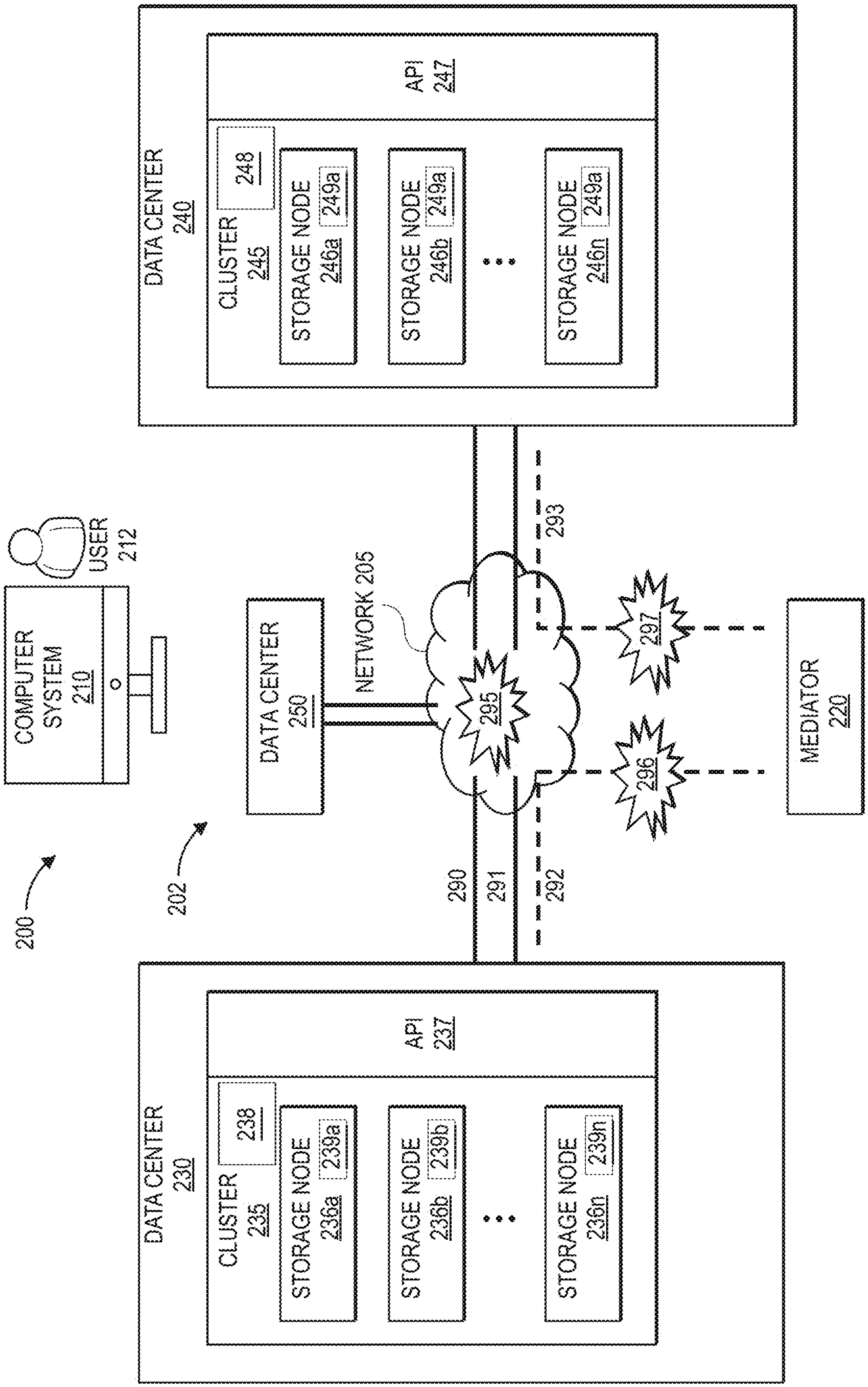
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, an optional data center 250, and optionally a mediator 220. The data centers 230, 240, and 250, the mediator 220, and the computer system 210 are coupled in communication via a network 205, which, depending upon the particular implementation, may be a Local Area Network (LAN), a Wide Area Network (WAN), or the Internet.

The data centers 230, 240, and 250 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230, 240 and 250 may represent a colocation data center in which a company rents space of a facility owned by others and located off the company premises. The data centers 230 and 240 are shown with a cluster (e.g., cluster 235, cluster 245). The data center 250 includes similar components as data centers 230 and 240. Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes a configuration database 238, at least two storage nodes 236*a-b*, optionally includes additional storage nodes (e.g., 236*n*) and an Application Programming Interface (API) 237. The storage nodes 236*a-n* each include a respective mediator agent 239*a-n*. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes a configuration database 248, at least two storage nodes 246*a-b*, optionally includes additional storage nodes (e.g., 246*n*) and includes an Application Programming Interface (API) 247. The storage nodes 246*a-n* each include a respective mediator agent 249*a-n*. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

A synchronous replication from a primary copy of data at a primary storage site (e.g., cluster 235) to a secondary copy of data at a secondary storage site (e.g., cluster 245) can fail due to inter cluster or cluster to mediator connectivity issues (e.g., failures 295, 296, 297). These issues can occur if the secondary storage site can not differentiate between the primary storage site being non-operational (or isolation), or just a network partition. A trigger for the automated failover is generated from a data path and if the data path is lost, this can lead to disruption. A data replication relationship between the primary and secondary storage sites guarantees non-disruptiveness due to allowing I/O operations to be handled with the secondary mirror copy of data. However, there are timing windows between the primary storage site being non-operational and the secondary mirror copy being ready to serve I/O operations where a second failure can lead to disruption. For example, a controller failure can occur in a cluster hosting the secondary mirror copy of the data. The primary bias mode and failover feature of the present design guarantees non-disruptive operations (e.g., operations of business enterprise applications, operations of software application) even in the presence of these multiple failures.

In one example, each cluster can have up to 5 consistency groups with each consistency group having up to 12 volumes. The system 202 provides an automatic unplanned failover feature at a consistency group granularity. The failover feature allows switching storage access from a primary copy of the data center 230 to a mirror copy of the data center 240 or vice versa.

Figure 3:
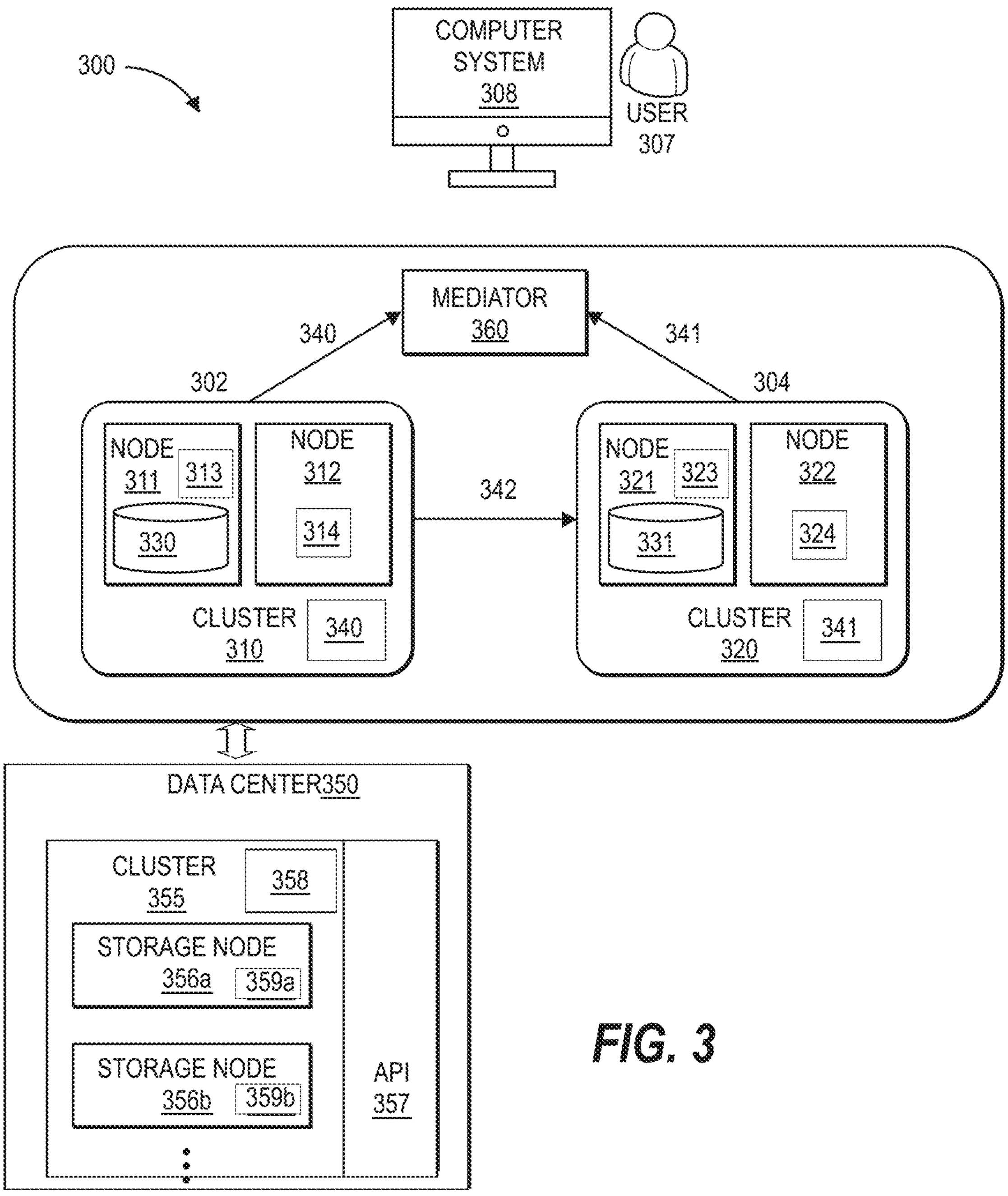
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 307) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, an optional data center 350 having a cluster 355, and a mediator 360. The clusters 310, 320, 355, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312, the cluster 320 includes nodes 321 and 322, and the optional cluster 355 includes nodes 356*a* and 356*b*. In one example, the cluster 320 has a data copy 331 that is a mirrored copy of the data copy 330 to provide non-disruptive operations at all times even in the presence of multiple failures including, but not limited to, network disconnection between the data centers 302 and 304 and the mediator 360. The cluster 355 may have an asynchronous replication relationship with cluster 310 or a mirror vault policy. The cluster 355 includes a configuration database 358, multiple storage nodes 356*a-b* each having a respective mediator agent 359*a-b*, and an Application Programming Interface (API) 357.

The multi-site distributed storage system 300 provides correctness of data, availability, and redundancy of data. In one example, the node 311 is designated as a leader and the node 321 is designated as a follower. The leader is given preference to serve I/O operations to requesting clients and this allows the leader to obtain a consensus in a case of a race between the clusters 310 and 320. The mediator 360 enables an automated unplanned failover (AUFO) in the event of a failure. The data copy 330 (leader), data copy 331 (follower), and the mediator 360 form a three way quorum. If two of the three entities reach an agreement for whether the leader or follower should serve I/O operations to requesting clients, then this forms a strong consensus.

The leader and follower roles for the clusters 310 and 320 help to avoid a split-brain situation with both of the clusters simultaneously attempting to serve I/O operations. For example, the leader may become unresponsive while a mediator detects this unresponsiveness to be a leader non-operational situation. The leader being non-operational can potentially cause a race between leader and follower copy both simultaneously attempting to obtain a consensus. However, only one of the leader and the follower should win the race and then be allowed to handle I/O operations. If this race is not prevented, it can result in the split-brain situation.

There are scenarios where both leader and follower copies can claim to be a leader copy. In one example, a follower cannot serve I/O until an AUFO happens. A leader doesn't serve I/O operations until the leader obtains a consensus.

The mediator agents (e.g., 313, 314, 323, 324, 359*a*, 359*b*) are configured on each node within a cluster. The system 300 can perform appropriate actions based on event processing of the mediator agents. The mediator agent(s) processes events that are generated at a lower level (e.g., volume level, node level) and generates an output for a consistency group level. In one example, the nodes 311, 312, 321, and 322 form a consistency group. The mediator agent provides services for various events (e.g., simultaneous events, conflicting events) generated in a business data replication relationship between each cluster.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (leader) while operations received by the node 321 (follower) are proxied to node 311.

Example Storage Node

Figure 4:
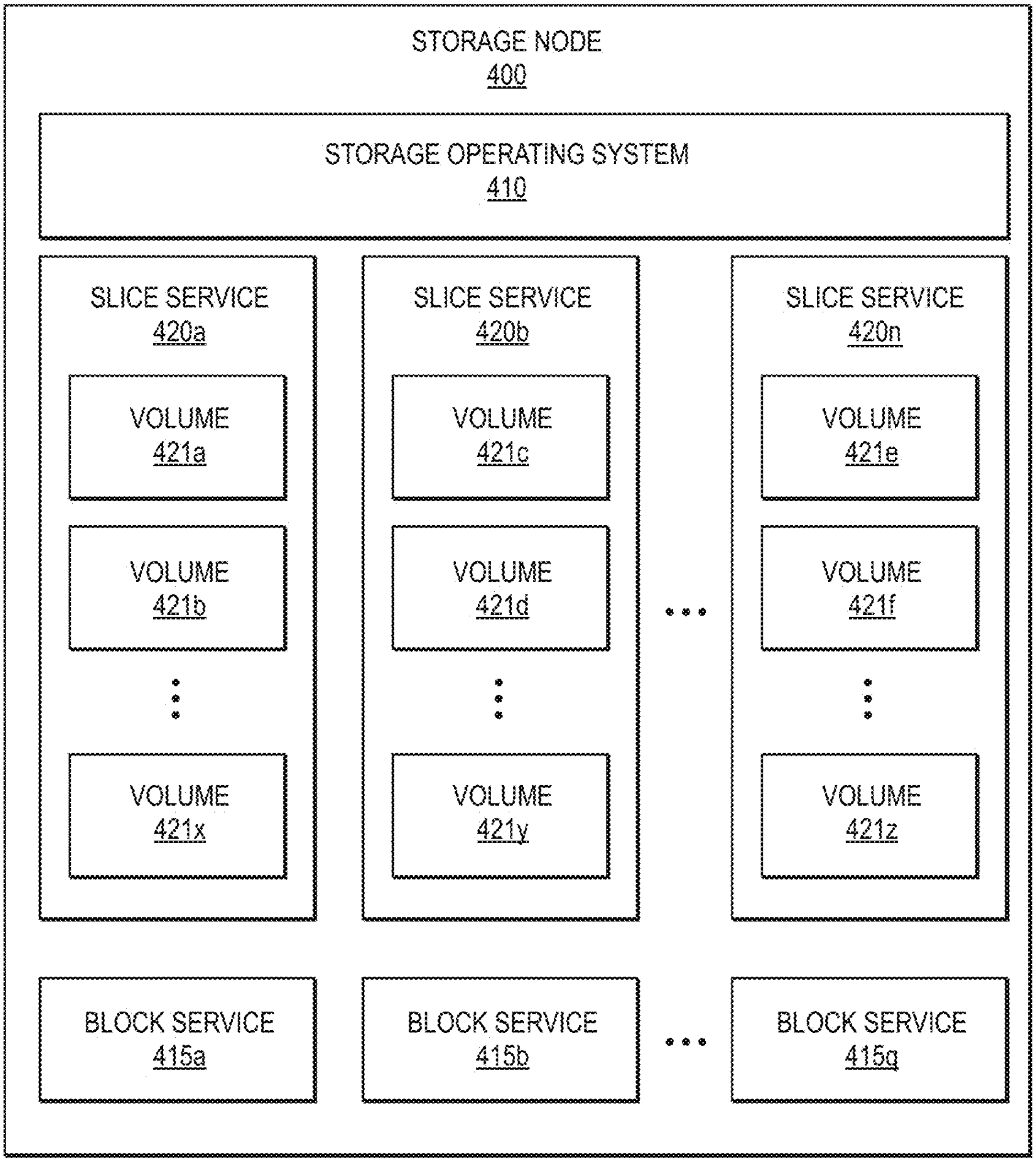
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136*a-n*, 146*a-n*, 236*a-n*, 246*a-n*, 311, 312, 331, 322, 712, 714, 752, 754) described herein. In the context of the present example, a storage node 400 may be a network storage controller or controller that provides access to data stored on one or more volumes. The storage node 400 includes a storage operating system 410, one or more slice services 420*a-n*, and one or more block services 415*a-q*. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421*a-x*, volumes 421*c-y*, and volumes 421*e-z*). Client systems (not shown) associated with an enterprise may store data to one or more volumes, retrieve data from one or more volumes, and/or modify data stored on one or more volumes.

The slice services 420*a-n* and/or the client system may break data into data blocks. Block services 415*a-q* and slice services 420*a-n* may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420*a-n* may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415*a-q* and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Figure 5:
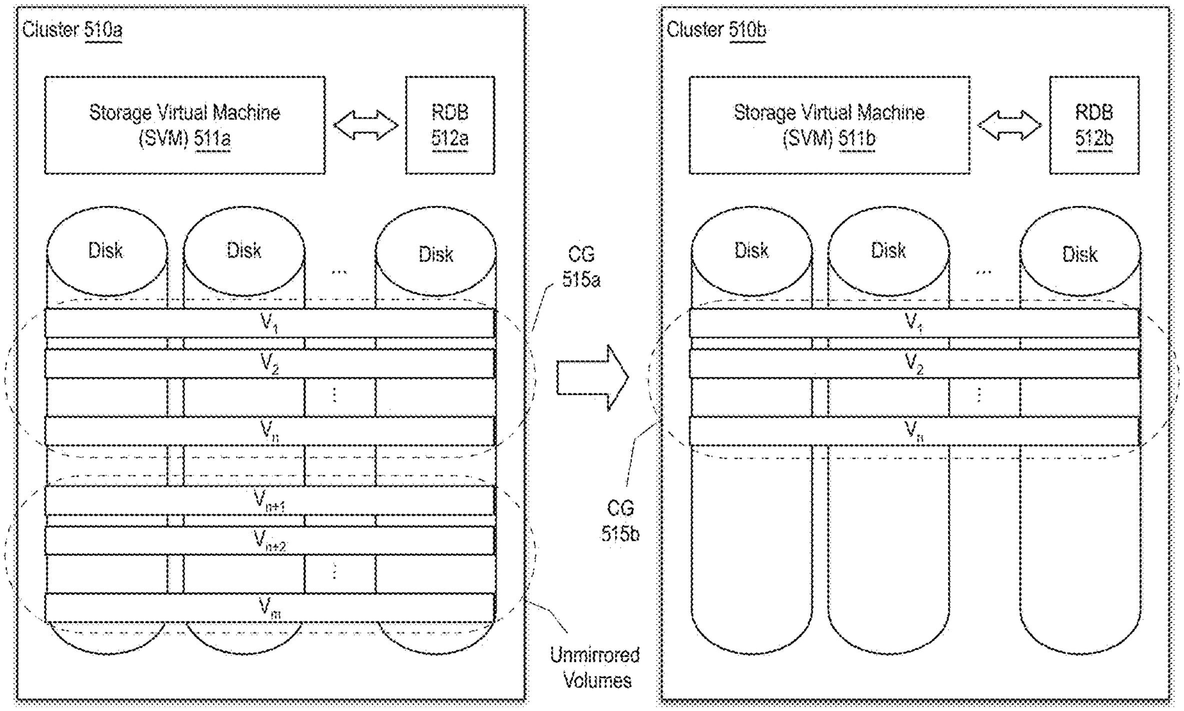
FIG. 5 is a block diagram illustrating the concept of a consistency group (CG) in accordance with an embodiment.

FIG. 5 is a block diagram illustrating the concept of a consistency group (CG) in accordance with an embodiment. In the context of the present example, a stretch cluster including two clusters (e.g., storage clusters 510*a* and 510*b*) is shown. The clusters may be part of a cross-site high-availability (HA) solution that supports zero recovery point objective (RPO) and zero recovery time objective (RTO) by, among other things, providing a mirror copy of a dataset at a remote location, which is typically in a different fault domain than the location at which the dataset is hosted. For example, cluster 510*a* may be operable within a first site (e.g., a local data center) and cluster 510*b* may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 515*a* or CG 515*b*). A CG is a collection of storage objects or data containers (e.g., volumes) within a cluster that are managed by a Storage Virtual Machine (e.g., SVM 511*a* or SVM 511*b*) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515*a* may be referred to as a local CG from the perspective of cluster 510*a* and as a remote CG from the perspective of cluster 510*b*. Similarly, CG 515*a* may be referred to as a remote CG from the perspective of cluster 510*b* and as a local CG from the perspective of cluster 510*b*. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB)

512*a* and 512*b*), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 515*b*) to which data is configured to be synchronously replicated may be referred to as being in the role of a destination CG, whereas the CG (e.g., CG 515*a*) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a consistency group may be described as performing certain actions (e.g., taking other members of a consistency group out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or leader cluster to a secondary or follower cluster), data replication may also be performed asynchronously and/or within the same cluster. Similarly, a single remote CG may protect multiple local CGs and/or multiple remote CGs may protect a single local CG. In addition, those skilled in the art will appreciate a cross-site high-availability (HA) solution may include more than two clusters, in which a mirrored copy of a dataset of a primary (leader) cluster is stored on more than one secondary (follower) cluster.

Figure 6:
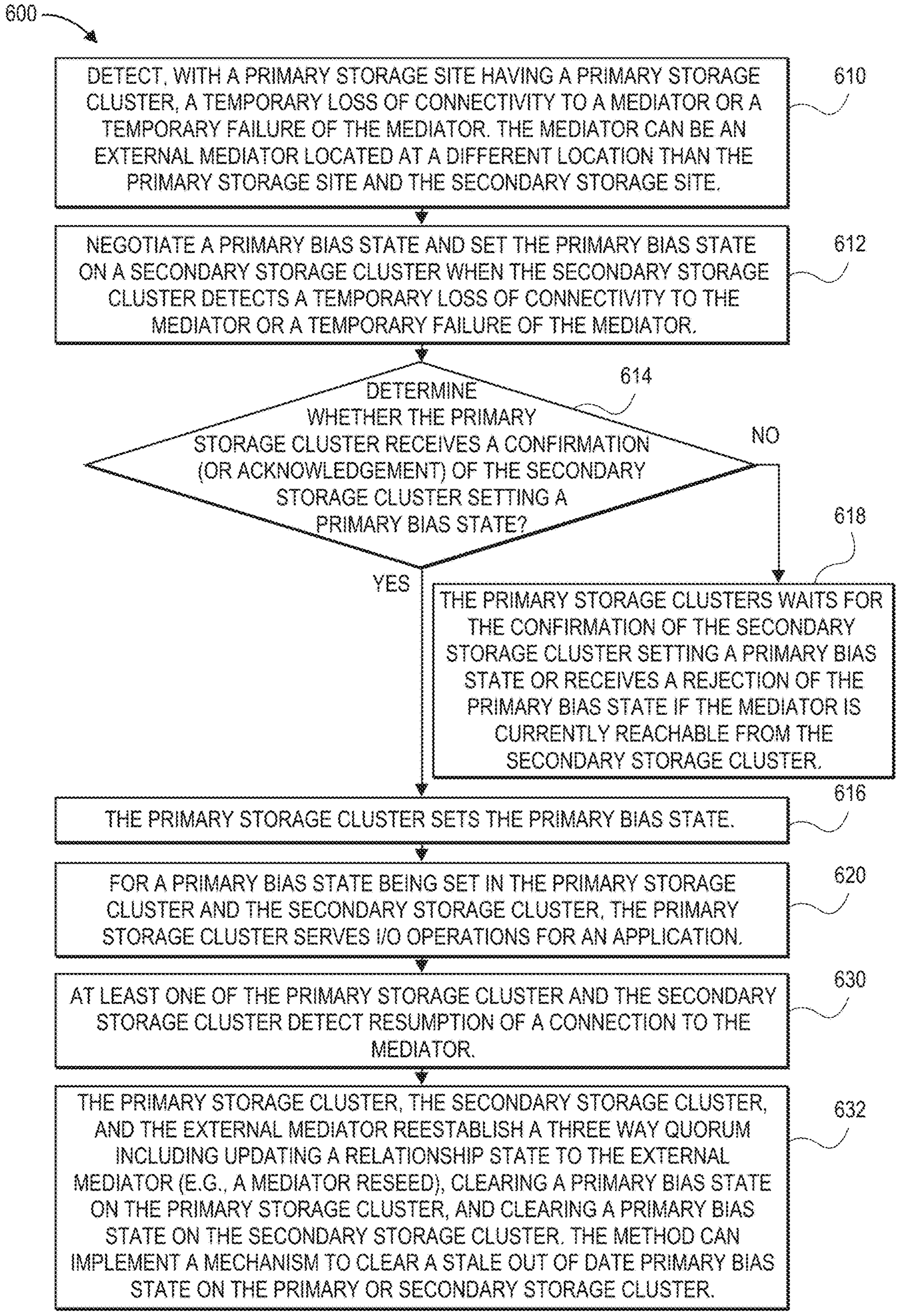
FIG. 6 is a flow diagram illustrating a computer-implemented method 600 of operations for a primary bias mode (or primary bias state) that provides non-disruptiveness for an application when an external mediator is temporarily unavailable or unreachable in accordance with an embodiment of the present disclosure.

FIG. 6 is a flow diagram illustrating a computer-implemented method 600 of operations for a primary bias mode (or primary bias state) that provides non-disruptiveness for an application (e.g., database application, email application) when an external mediator is temporarily unavailable or unreachable in accordance with an embodiment of the present disclosure. As noted above, this primary bias mode of the present design provides an order of operations such that a primary copy of a first data center continues to serve I/O operations until a mirror copy of a second data center is ready. This primary bias mode provides non-disruptiveness when an external mediator in temporarily unavailable—in presence of various failures including, but not limited to, network disconnection among different sites including a primary storage site, a secondary storage site, and the external mediator.

Although the operations in the computer-implemented method 600 are shown in a particular order, the order of the actions can be modified. Thus, the illustrated embodiments can be performed in a different order, and some operations may be performed in parallel. Some of the operations listed in FIG. 6 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 600 may be executed by a storage controller, a storage virtual machine (e.g., SVM 511*a*, SVM 511*b*), a multi-site distributed storage system, a computer system, a machine, a server, a web appliance, a centralized system, a storage node (e.g., 136*a-n*, 146*a-n*, 236*a-n*, 246*a-n*, 311, 312, 321, 322, 400), or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

In one embodiment, a multi-site distributed storage system includes a primary storage cluster having a primary copy of data in a consistency group (CG1). The consistency group of the primary storage cluster is initially assigned a leader role. A secondary storage cluster has a mirror copy of the data of the primary copy in the consistency group. The consistency group of the secondary storage cluster (CG2) is initially assigned a follower role.

At operation 610, a primary storage site having a primary storage cluster detects a temporary loss of connectivity to a mediator (e.g., external mediator located at a different location than the primary storage site and the secondary storage site) or a temporary failure of the mediator. At operation 612, the method includes negotiating a primary bias state and setting the primary bias state on a secondary storage cluster when the secondary storage cluster also detects a temporary loss of connectivity to the mediator or a temporary failure of the mediator.

At operation 614, the method includes determining whether the primary storage cluster receives a confirmation (or acknowledgement) of the secondary storage cluster setting a primary bias state. If so, then the primary storage cluster sets the primary bias state at operation 616.

If not, then at operation 618 the primary storage clusters waits for the confirmation of the secondary storage cluster setting a primary bias state or receives a rejection of the primary bias state if the mediator is reachable from the secondary storage cluster. The following bias state can not occur:

primary storage cluster—sets a primary bias state while the secondary storage cluster does not set a primary bias state. The state is persistent.

A primary bias state can be implemented in a configuration database (e.g., persistent replicated database (RDB) 512*a*, 512*b*), which is available on all storage nodes of a storage cluster.

At operation 620, for a primary bias state being set in the primary storage cluster and the secondary storage cluster, the primary storage cluster serves I/O operations for an application. A primary storage cluster is granted a consensus and this may occur in response to an out of sync state for a data replication relationship between a CG of the primary storage cluster and a peered CG of the secondary storage cluster. A secondary storage cluster can retry being an authority or be failover incapable in response to an out of sync state for a data replication relationship between a CG of the primary storage cluster and a peered CG of the secondary storage cluster.

At operation 630, at least one of the primary storage cluster and the secondary storage cluster detect resumption of a connection to the external mediator. At operation 632, the primary storage cluster, the secondary storage cluster, and the external mediator reestablish a three way quorum including updating a relationship state to the external mediator (e.g., a mediator reseed), clearing a primary bias state on the primary storage cluster, and clearing a primary bias state on the secondary storage cluster. The method can implement a mechanism to clear a stale out of date primary bias state on the primary storage cluster or the secondary storage cluster.

The primary bias feature provides non-disruptiveness guarantee and avoidance of split-brain without using a mediator due to a temporary loss of connection to the mediator or a temporary failure of the mediator for different failure examples. A first failure example is a temporary mediator failure and then an intercluster link failure between the primary storage site and the secondary storage site. The primary storage cluster will be isolated due to these failures and data access will be disrupted. The primary bias state will be negotiated and set at the primary storage cluster and the secondary storage cluster prior to the intercluster link failure. This results in the primary storage cluster serving I/O operations for an application despite the double failure scenario.

A second failure example is a mediator link failure and then a failure at the secondary storage cluster resulting in a down state for the secondary storage cluster. The primary storage cluster will be isolated due to these failures and data access will be disrupted. The primary bias state will be negotiated and set at the primary storage cluster and the secondary storage cluster prior to the failure at the secondary storage cluster. This results in the primary storage cluster serving I/O operations for an application despite the double failure scenario.

A third failure example is a mediator failure and then a subsequent failure at the secondary storage cluster resulting in a down state for the secondary storage cluster and an intercluster link failure. The primary storage cluster will be isolated due to these failures and data access will be disrupted. The primary bias state will be negotiated and set at the primary storage cluster and the secondary storage cluster prior to the failures at the secondary storage cluster and the intercluster link. This results in the primary storage cluster serving I/O operations for an application despite the triple failure scenario.

If the loss of the external mediator coincides with a failure of an intercluster link between the primary and secondary storage sites, then the primary bias state cannot be set since the primary bias negotiation requires communication between the two storage sites. This scenario leads to disruption.

Figure 7:
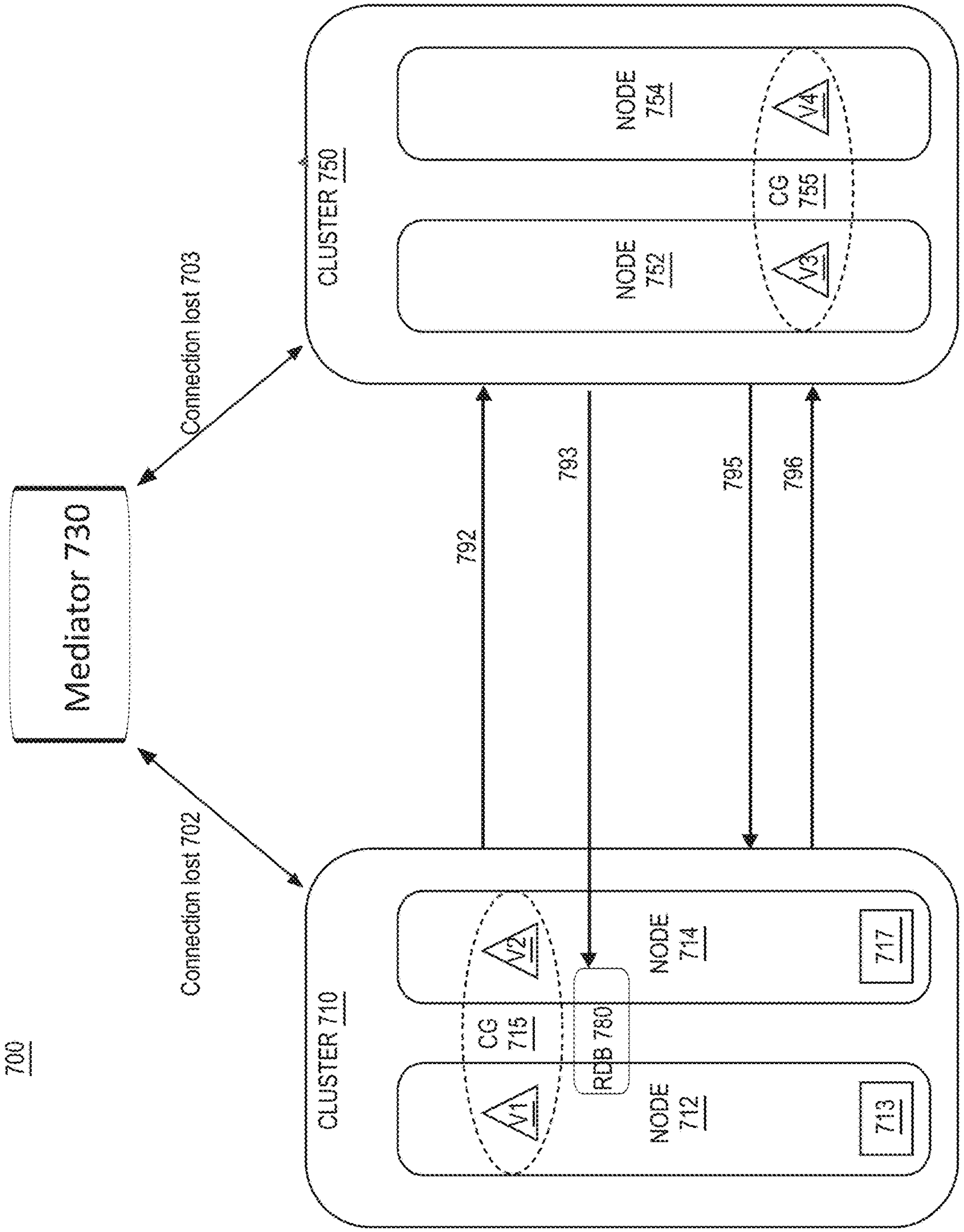
FIG. 7 is a block diagram of a multi-site distributed storage system 700 that has a primary bias feature in accordance with an embodiment of the present disclosure.

FIG. 7 is a block diagram of a multi-site distributed storage system 700 that has a primary bias feature in accordance with an embodiment of the present disclosure. As noted above, this primary bias feature provides non-disruptiveness even when an external mediator is temporarily unavailable in presence of various failures.

In one embodiment, the distributed storage system 700 includes a primary storage cluster 710 with a primary copy of data in a consistency group (CG) 715, a mediator 730, and a secondary storage cluster 750. A consistency group may include a subset or all volumes or data containers of a storage node. The consistency group 715 includes volume V1 of node 712 and volume V2 of node 714. Initially, CG 715 can be assigned a leader role to handle I/O operations for an application. The secondary storage cluster 750 has a mirror copy of the data in the consistency group 755. The consistency group 755 may include a volume V3 of node 752 and volume V4 of node 754. CG 755 can be initially assigned a follower role.

Initially, a primary site having a primary storage cluster 710 detects a temporary loss of connectivity 702 to an external mediator 730. The primary storage cluster 710 starts a thread to mark state information on the secondary storage cluster 750. Next, the primary storage cluster 710 negotiates a primary bias state by setting a remote primary bias state on the secondary storage cluster 750 at operation 792 and waits for an acknowledgement from the secondary storage cluster 750. Upon receiving an acknowledgement at operation 793, the primary storage cluster 710 sets the primary bias state on the primary storage cluster 710. The acknowledgement provides an agreement that the secondary storage cluster 750 will not participate in a failover event during and after the negotiation.

This agreement is achieved by the primary storage cluster 710 communicating with the secondary storage cluster 750 and setting a persistent state there. This state ensures the secondary storage cluster 750 does not initiate a request for failover or consensus. Upon a successful acknowledgement of this call, the primary storage cluster 710 can safely assume authority to enter the primary bias mode. This transactional order is important to overcome the distributed nature of the problem and both storage sites attempting to act as the leader.

A secondary site having a secondary storage cluster 750 can detect a temporary loss of connectivity 703 to an external mediator 730. The secondary storage cluster 750 starts a thread to mark state information on the primary storage cluster 710. Next, the secondary storage cluster 750 negotiates a primary bias state by setting a remote primary bias state on the primary storage cluster 710 at operation 795 and waits for an acknowledgement from the primary storage cluster 710. Upon receiving an acknowledgement at operation 796, the secondary storage cluster 750 sets the primary bias state on the primary storage cluster 710. The acknowledgement provides an agreement that the secondary storage cluster 750 will not participate in a failover event during and after the negotiation.

A primary storage cluster chosen as an authority to grant consensus will maintain state information in a configuration database (e.g., 512*a*, 512*b*, RDB 780) with the following state information for a given CG as indicated below in table 1.

| Local Cluster uuid | Remote uuid | Primary Bias Local | Primary Bias Remote |
|---|---|---|---|
| 710 | 750 | False > True | False > True |

A secondary storage cluster will maintain state information in a configuration database (e.g., 512*a*, 512*b*) with the following state information for a given CG as indicated below in table 2.

| Local Cluster uuid | Remote uuid | Primary Bias Local | Primary Bias Remote |
|---|---|---|---|
| 750 | 710 | True > False | True > False |

As previously discussed, the negotiation for the primary bias state is a two step process. The primary storage site has to first get an agreement from the secondary storage site that the secondary storage site will not participate in a failover event during and after the negotiation. This enables the primary storage site to safely assume authority to enter the primary bias mode.

FIGS. 8, 9A, 9B, 9C, 10A, 10B, and 10C illustrate computer-implemented methods of a negotiation process to handle race conditions for a first process to set a primary bias state and a second process to clear the primary bias state of a primary storage cluster based on connection state changes between a mediator and the primary storage cluster or between the mediator and a secondary storage cluster in accordance with one embodiment. The race conditions are handled through a replicated database serialization and use of generation indicator (e.g., generation number) to drop stale event flows.

When both storage clusters of the storage sites are able to communicate with the mediator, the process to clear the primary bias state is started. The state is cleared when the storage clusters negotiate and agree with each other to work back in a normal mode where Failover operations and mediator as a tie-breaker is resumed. During the clear process, the primary bias state is first cleared on the primary storage cluster and then the state preventing failover on the secondary storage cluster is cleared.

The order of the transactions is important to maintain the same rules of engagement. The negotiation process also handles the race conditions for a first process to set a primary bias state and a second process to clear the primary bias state based on the connection state changes. In a highly fluctuating network to the mediator, there is a high likelihood of race conditions where more than one storage node (e.g., node 712, node 714, node 752, node 754) of the storage cluster may be in the process of setting or clearing the primary bias state.

Figure 8:
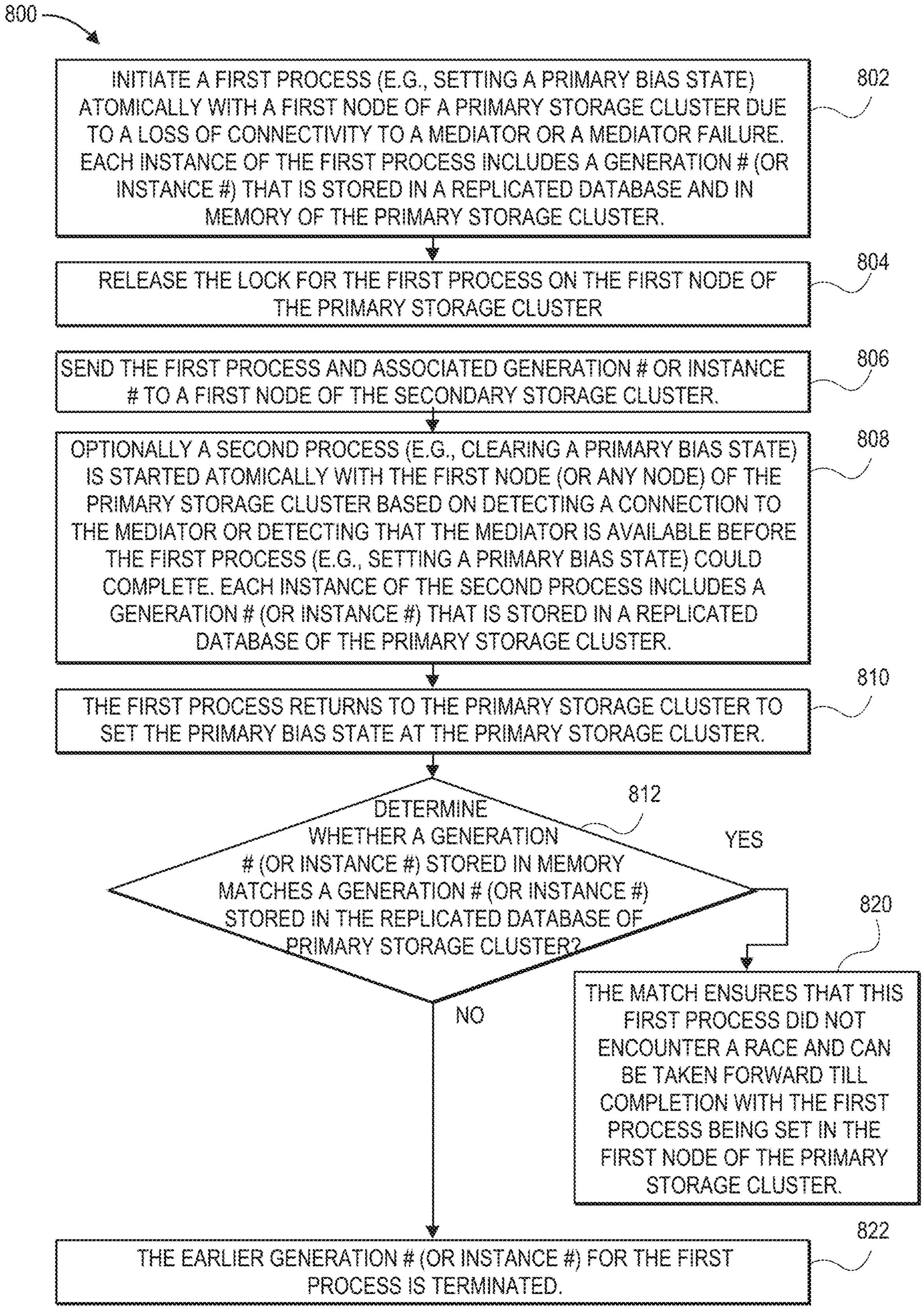
FIG. 8 illustrates a computer-implemented method of a negotiation process to handle race conditions for a first process to set a primary bias state and a second process to clear the primary bias state of a primary storage cluster based on connection state changes between a mediator and the primary storage cluster or between the mediator and a secondary storage cluster in accordance with one embodiment.
Figure 9A:
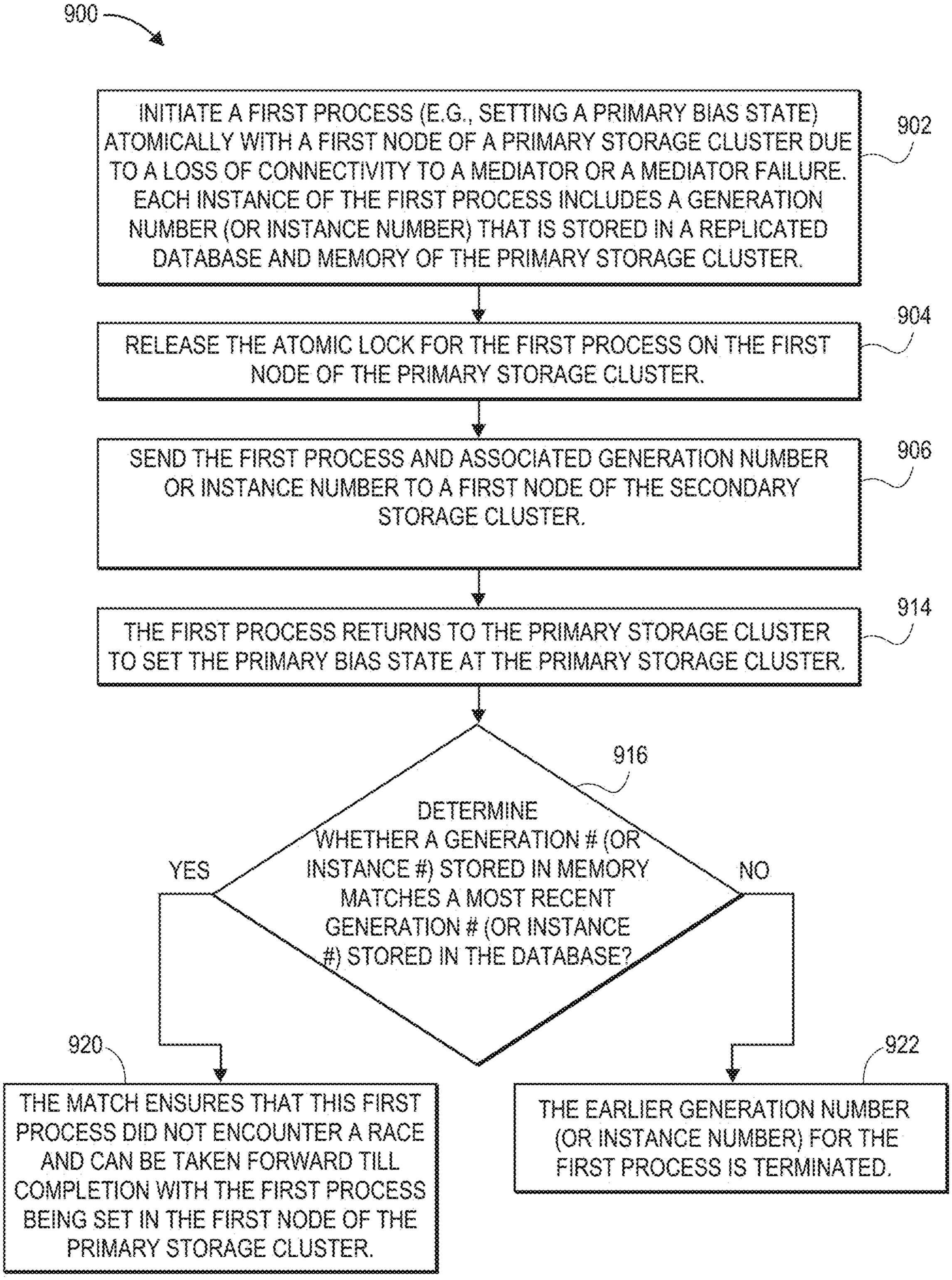
FIGS. 9A, 9B, and 9C illustrate computer-implemented methods of a negotiation process to handle race conditions for a first process to set a primary bias state, a second process to clear the primary bias state of a primary storage cluster, and a third process to set the primary bias state based on connection state changes between a mediator and the primary storage cluster or between the mediator and a secondary storage cluster in accordance with one embodiment.
Figure 9B:
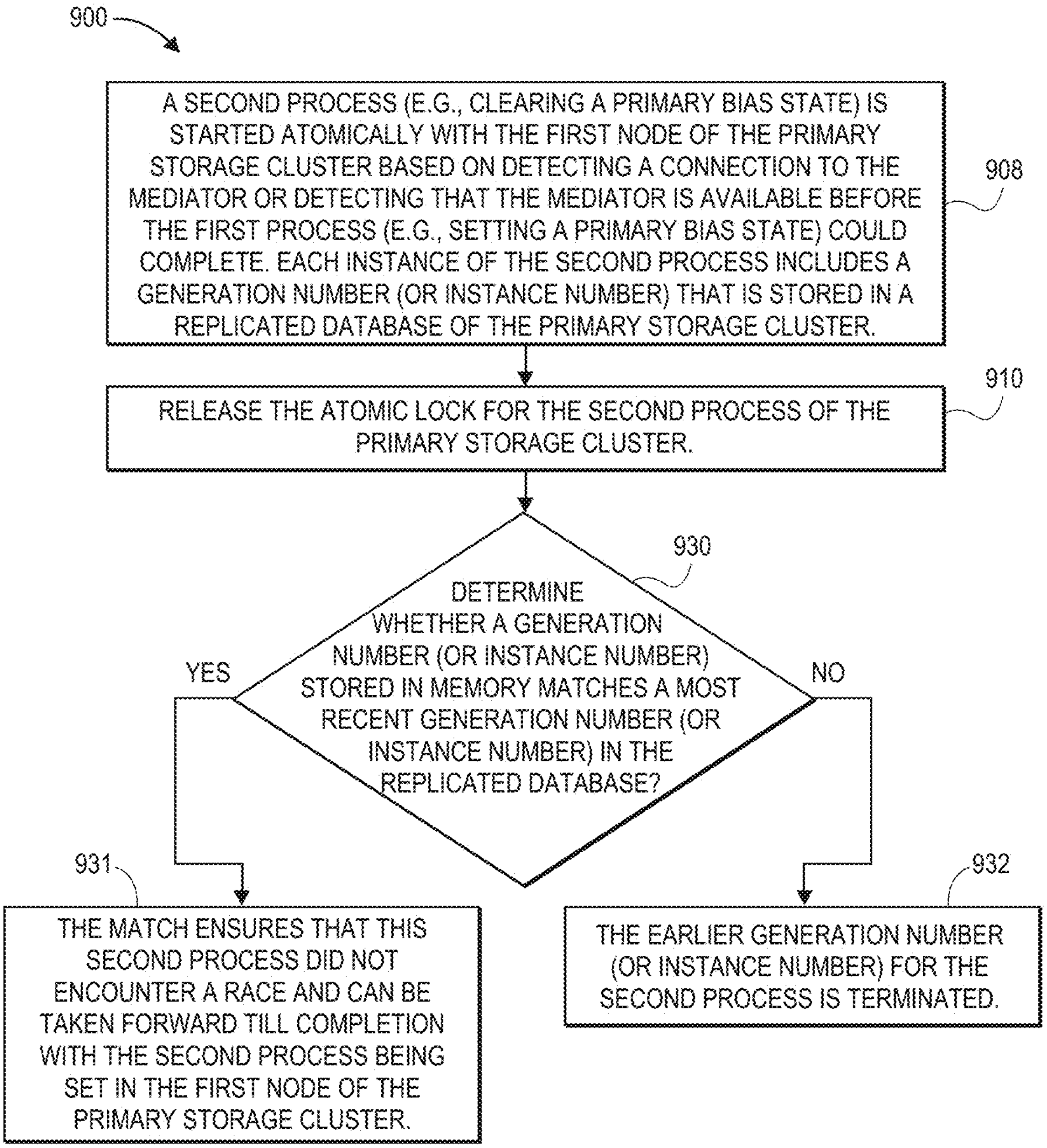
Figure 9C:
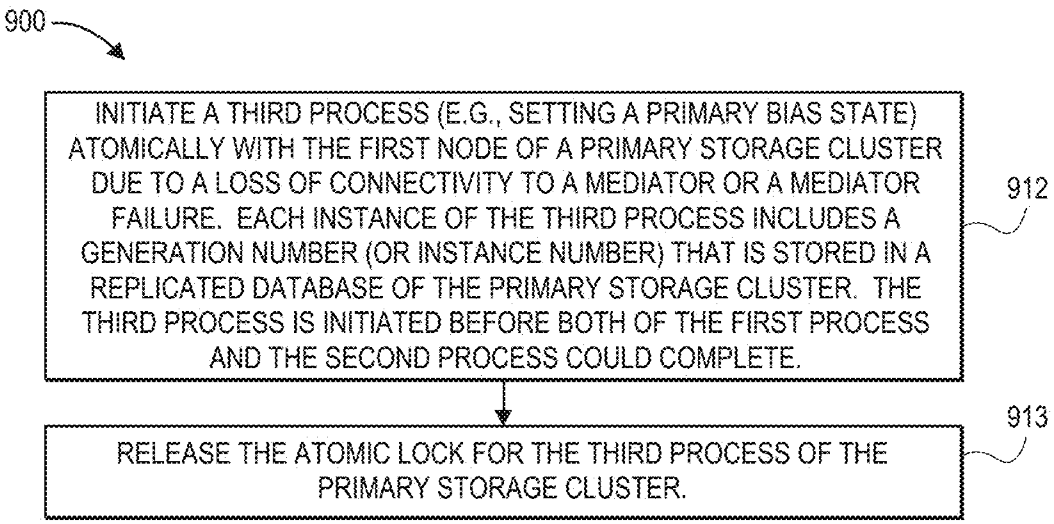

FIGS. 8, 9A, 9B, 9C, 10A, 10B, and 10C illustrate the following possible scenarios:

Set process started->clear process started before set process could complete (FIG. 8). Set process started->clear process started->another set process started before both the previous processes could complete (FIG. 9A, 9B, 9C). Set process started on node N1->clear process started->another set process started on node N2 before both the previous processes could complete (10A, 10B, and 10C).

From the above scenarios, it is evident that at the same time there can be more than one set or clear processes active in the distributed storage system and the distributed storage system needs a mechanism to serialize these processes. To achieve this, the set and clear processes are made atomic, that is at a time only one process will be executing on a storage cluster. But as mentioned earlier, setting and clearing both are two step processes. After doing the local processing inside a lock, the flow must go on the other storage cluster also and this leaves a window for other processes to come on the local cluster. As the latest process is generated from the current matching conditions, all the previous processes can be ignored and terminated. To achieve this, each instance of a process carries a generation indicator (e.g., generation number) or instance indicator (e.g., instance number) with it. Whenever the process starts to run, it checks for the matching conditions inside a lock and caches the generation number in memory of a storage cluster. When a process moves to the secondary storage cluster and returns to the local primary storage cluster, the process compares the cached generation indicator in memory with latest generation indicator stored persistently in a replicated database. A match between the cached generation indicator in memory of the primary storage cluster and the latest generation indicator stored persistently in a replicated database of the primary storage cluster ensures that this process did not encounter a race and can be taken forward till completion.

For operation 802 of FIG. 8, the computer-implemented method 800 includes initiating a first process (e.g., setting a primary bias state) atomically with a first storage node of a primary storage cluster due to a temporary loss of connectivity to a mediator or a temporary mediator failure. Each instance of the first process includes a generation indicator number (or instance indicator) that is stored in a replicated database of the primary storage cluster and also stored in memory of the primary storage cluster. At operation 804, the computer-implemented method releases the atomic lock for the first process on the first storage node of the primary storage cluster. At operation 806, the computer-implemented method sends the first process and associated generation indicator (e.g., generation number) or instance indicator (e.g., instance number) to a first storage node of the secondary storage cluster, which will handle the first process (e.g., setting a primary bias state).

At operation 808, optionally a second process (e.g., clearing a primary bias state) is started atomically with the first storage node (or any node) of the primary storage cluster based on detecting a connection to the mediator or detecting that the mediator is available before the first process (e.g., setting a primary bias state) could complete. Each instance of the second process includes a generation number (or instance number) that is stored in the replicated database of the primary storage cluster. A first generation number of the first process can be initially stored in the replicated database and then the first generation number can be incremented or replaced in the replicated database with a second generation number of the second process.

At operation 810, the first process returns to the primary storage cluster to set the primary bias state at the primary storage cluster. At operation 812, the computer-implemented method determines whether the generation number (e.g., first generation number) stored in memory of the primary storage cluster matches the latest generation number (e.g., first generation number if second process does not initiate, second generation number if second process does initiate) that has been stored in the replicated database of the primary storage cluster.

If a generation number (or instance number) stored in the memory matches a generation number (or instance number) stored in the replicated database of the primary storage cluster, then the match ensures that this process did not encounter a race and can be taken forward till completion with the first process being set in the first node of the primary storage cluster at operation 820.

If a generation number (or instance number) stored in the memory does not match a latest or most recent generation number (or instance number) stored in the replicated database of the primary storage cluster, then the earlier generation number (or instance number) for the first process is terminated at operation 822.

For operation 902 of FIG. 9A, the computer-implemented method 900 includes initiating a first process (e.g., setting a primary bias state) atomically with a first node of a primary storage cluster due to a temporary loss of connectivity to a mediator or a temporary mediator failure. Each instance of the first process includes a generation number (or instance number) that is stored in a replicated database of the primary storage cluster and also stored in memory of the primary storage cluster. At operation 904, the computer-implemented method releases the atomic lock for the first process on the first node of the primary storage cluster. At operation 906, the computer-implemented method sends the first process and associated generation number or instance number to a first node of the secondary storage cluster, which will handle the first process (e.g., setting a primary bias state).

At operation 908 as illustrated in FIG. 9B, a second process (e.g., clearing a primary bias state) is started atomically with the first node of the primary storage cluster based on detecting a connection to the mediator or detecting that the mediator is available before the first process (e.g., setting a primary bias state) could complete. Each instance of the second process includes a generation number (or instance number) that is stored in a replicated database of the primary storage cluster. A first generation number of the first process can be initially stored in the replicated database and then the first generation number can be incremented or replaced in the replicated database with a second generation number of the second process.

At operation 910, the computer-implemented method releases the atomic lock for the second process of the primary storage cluster.

For operation 912 as illustrated in FIG. 9C, the computer-implemented method includes initiating a third process (e.g., setting a primary bias state) atomically with the first node of a primary storage cluster due to a temporary loss of connectivity to a mediator or a temporary mediator failure. Each instance of the third process includes a generation number (or instance number) that is stored in a replicated database of the primary storage cluster. In one example, the third process is initiated before both of the first process and the second processes could complete. At operation 913, the computer-implemented method releases the atomic lock for the third process of the primary storage cluster.

At operation 914 (returning to FIG. 9A), the first process returns to the primary storage cluster to set the primary bias state at the primary storage cluster. At operation 916, the computer-implemented method determines whether a generation number (or instance number) stored in memory matches a most recent generation number (or instance number) that has been stored in the replicated database of the primary storage cluster.

If a generation number (or instance number) stored in memory matches a most recent generation number (or instance number) in the replicated database of the primary storage cluster, then the match ensures that this process did not encounter a race and can be taken forward till completion with the first process being set in the first node of the primary storage cluster at operation 920.

If a generation number (or instance number) stored in memory does not match a most recent generation number (or instance number) in the replicated database of the primary storage cluster, then the earlier generation number (or instance number) for the first process is terminated at operation 922.

At operation 930 (returning to FIG. 9B), the computer-implemented method determines whether a generation number (or instance number) stored in memory matches a most recent generation number (or instance number) that has been stored in the replicated database of the primary storage cluster.

If a generation number (or instance number) stored in the memory matches a most recent generation number (or instance number) in the replicated database, then the match ensures that this process did not encounter a race and can be taken forward till completion with the second process being set in the first node of the primary storage cluster at operation 931.

If a generation number (or instance number) stored in memory does not match a most recent generation number (or instance number) stored in the replicated database, then the earlier generation number (or instance number) for the second process is terminated at operation 932.

Figure 10A:
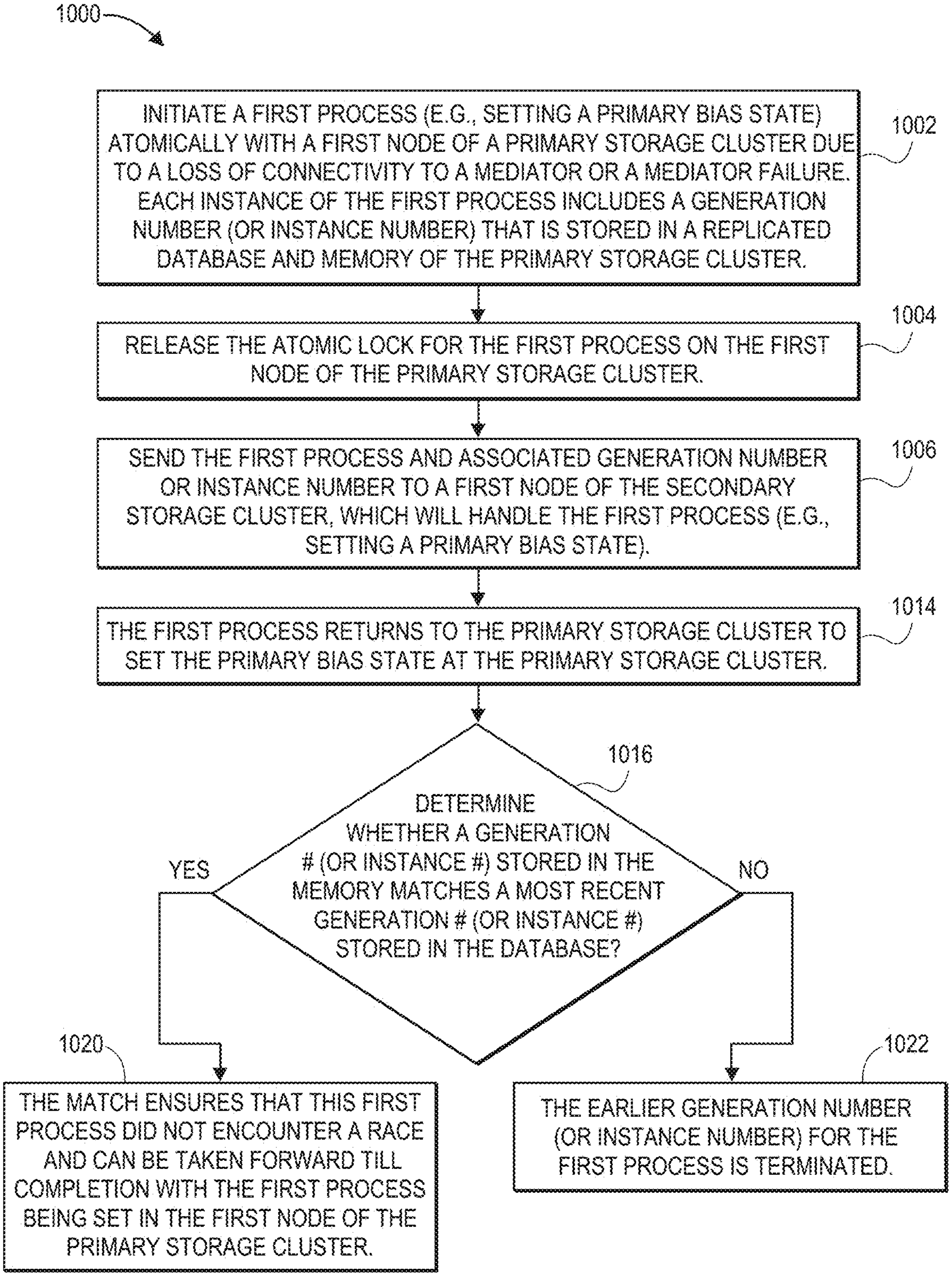
FIGS. 10A, 10B, and 10C illustrate computer-implemented methods of a negotiation process to handle race conditions for a first process to set a primary bias state, a second process to clear the primary bias state of a primary storage cluster, and a third process to set the primary bias state based on connection state changes between a mediator and the primary storage cluster or between the mediator and a secondary storage cluster in accordance with one embodiment.
Figure 10B:
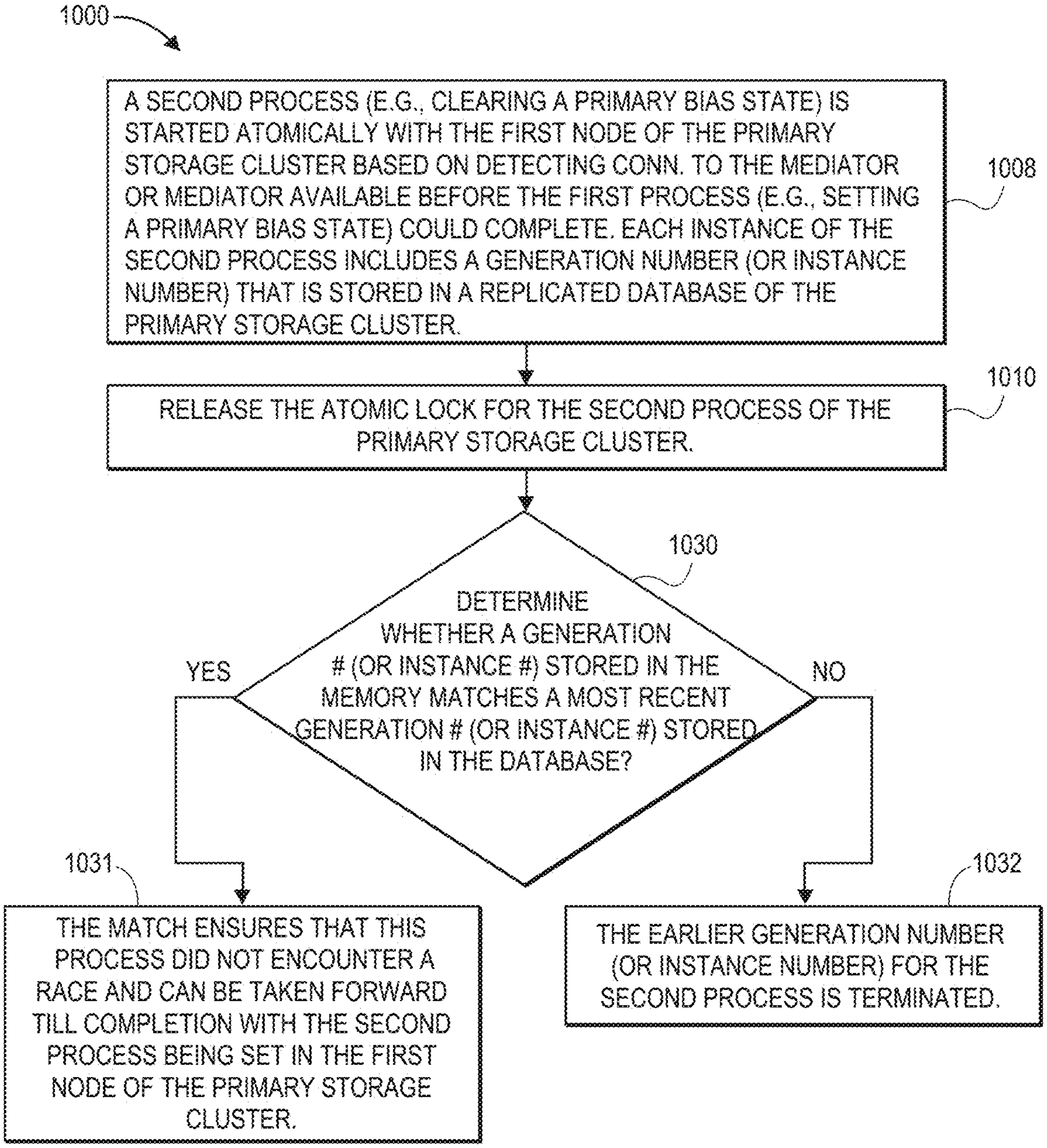

For operation 1002 of FIG. 10A, the computer-implemented method 1000 includes initiating a first process (e.g., setting a primary bias state) atomically with a first node of a primary storage cluster due to a temporary loss of connectivity to a mediator or a temporary mediator failure. Each instance of the first process includes a generation number (or instance number) that is stored in a replicated database and in memory of the primary storage cluster. At operation 1004, the computer-implemented method releases the atomic lock for the first process on the first node of the primary storage cluster. At operation 1006, the computer-implemented method sends the first process and associated generation number or instance number to a first node of the secondary storage cluster, which will handle the first process (e.g., setting a primary bias state).

At operation 1008, a second process (e.g., clearing a primary bias state) is started atomically with the first node of the primary storage cluster based on detecting a connection to the mediator or detecting that the mediator is available before the first process (e.g., setting a primary bias state) could complete. Each instance of the second process includes a generation number (or instance number) that is stored in a replicated database of the primary storage cluster. At operation 1010, the computer-implemented method releases the atomic lock for the second process of the primary storage cluster.

Figure 10C:
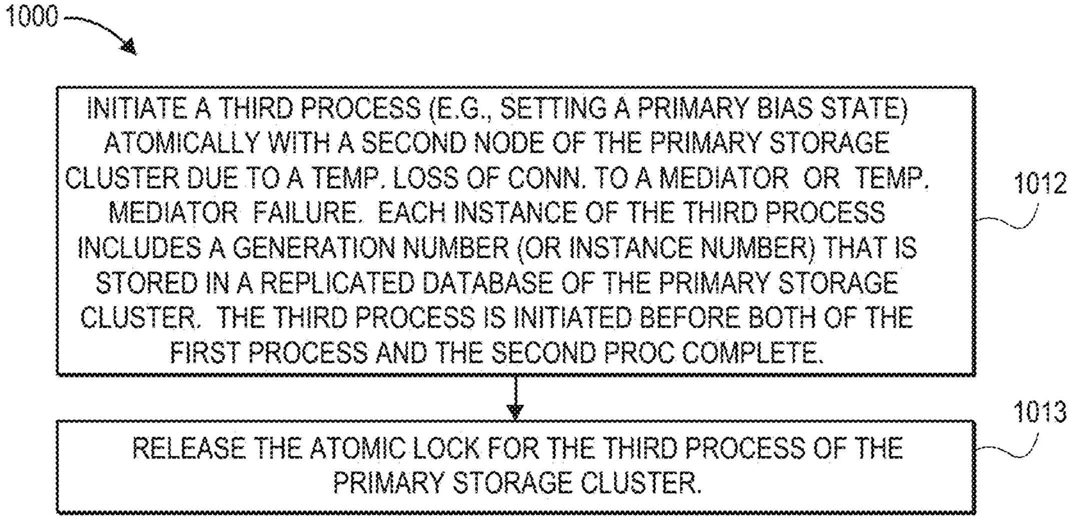

For operation 1012 of FIG. 10C, the computer-implemented method includes initiating a third process (e.g., setting a primary bias state) atomically with a second node of the primary storage cluster due to a temporary loss of connectivity to a mediator or a temporary mediator failure. Each instance of the third process includes a generation number (or instance number) that is stored in a replicated database of the primary storage cluster. In one example, the third process is initiated before both of the first process and the second process could complete.

At operation 1013, the computer-implemented method releases the atomic lock for the third process of the primary storage cluster.

At operation 1014, the first process returns to the primary storage cluster to set the primary bias state at the primary storage cluster. At operation 1016, the computer-implemented method determines whether a generation number (or instance number) stored in the memory matches a most recent generation number (or instance number) that has been stored in the replicated database of the primary storage cluster.

If a generation number (or instance number) stored in the memory matches a most recent generation number (or instance number) stored in the replicated database, then the match ensures that this process did not encounter a race and can be taken forward till completion with the first process being set in the first node of the primary storage cluster at operation 1020.

If a generation number (or instance number) stored in the memory does not match a most recent generation number (or instance number) stored in the replicated database, then the earlier generation number (or instance number) for the first process is terminated at operation 1022.

At operation 1030 (returning to FIG. 10B), the computer-implemented method determines whether a generation number (or instance number) stored in memory matches a most recent generation number (or instance number) that has been stored in the replicated database of the primary storage cluster.

If a generation number (or instance number) stored in memory matches a most recent generation number (or instance number) stored in the replicated database, then the match ensures that this process did not encounter a race and can be taken forward till completion with the second process being set in the first node of the primary storage cluster at operation 1031.

If a generation number (or instance number) stored in memory does not match a most recent generation number (or instance number) stored in the replication database, then the earlier generation number (or instance number) for the second process is terminated at operation 1032.

Figure 11:
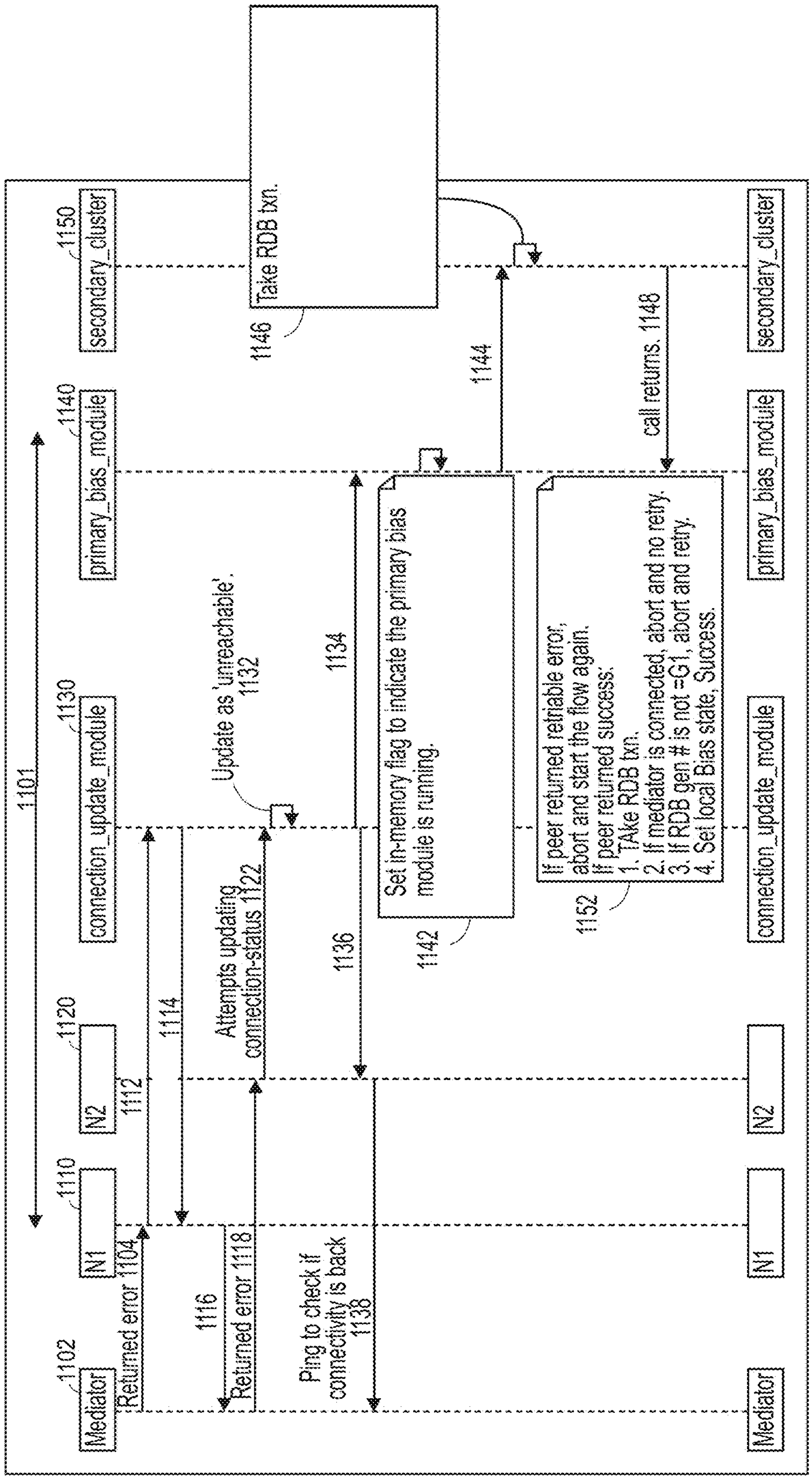
FIG. 11 is a flow diagram 1100 illustrating operations for a primary bias mode (or primary bias state) that provides non-disruptiveness for an application when an external mediator is unavailable or unreachable in accordance with an embodiment of the present disclosure.

FIG. 11 is a flow diagram 1100 illustrating operations for a primary bias mode (or primary bias state) that provides non-disruptiveness for an application when an external mediator is temporarily unavailable or unreachable in accordance with an embodiment of the present disclosure. This primary bias mode provides non-disruptiveness when an external mediator in unavailable—in presence of various failures including, but not limited to, network disconnection among different sites including a primary storage site, a secondary storage site, and the external mediator.

Although the operations in FIG. 11 are shown in a particular order, the order of the actions can be modified. Thus, the illustrated embodiments can be performed in a different order, and some operations may be performed in parallel. Some of the operations listed in FIG. 11 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of FIG. 11 may be executed by a storage controller, a storage virtual machine (e.g., SVM 511*a*, SVM 511*b*), a multi-site distributed storage system, a computer system, a machine, a server, a web appliance, a centralized system, a storage node (e.g., 136*a-n*, 146*a-n*, 236*a-n*, 246*a-n*, 311, 312, 321, 322, 400), or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

In one embodiment, a multi-site distributed storage system includes a primary storage cluster 1101 having a primary copy of data in a consistency group (CG1). The consistency group of the primary storage cluster is initially assigned a leader role. A secondary storage cluster 1150 has a mirror copy of the data of the primary copy in the consistency group. The consistency group of the secondary storage cluster (CG2) is initially assigned a follower role. The primary storage cluster 1101 includes storage nodes N1 1110, N2 1120, connection update module 1130, and primary bias module 1140. The mediator 1102 is located remotely from the primary storage cluster 1101 of a primary storage site and the secondary storage cluster 1150 of a secondary storage site.

At operation 1104 (returned error message), a primary storage site having the primary storage cluster 1101 with a first node (N1 1110) detects a temporary loss of connectivity to a mediator 1102 (e.g., external mediator located at a different location than the primary storage site and the secondary storage site) or a temporary failure of the mediator. At operation 1112, NI attempts to update connection status by sending a request to a connection update module 1130. At operation 1114, the N1 request returns to N1 1110 because a communication link between a second node (N2 1120) and the mediator 1102 is operational. At operation 1116, the N1 1110 pings the mediator 1102 on a periodic basis (e.g., every 1 to 3 seconds) to determine if connectivity to the mediator 1102 has been restored.

At operation 1118 (returned error message), the second node (N2 1120) detects a loss of connectivity to the mediator 1102 (e.g., external mediator located at a different location than the primary storage site and the secondary storage site) or a failure of the mediator. At operation 1122, N2 attempts to update connection status by sending a request to the connection update module 1130. At operation 1132, the connection update module 1130 provides an update that the mediator 1102 is unreachable from N1 1110 and N2 1120.

In one example, all storage nodes of the primary storage cluster 1101 run a long poll and try to update the connection status upon a link to the mediator being down after collating results from all nodes of the primary storage cluster 1101. The storage node that detects last that the mediator 1102 is not reachable will start the primary bias thread on the primary storage cluster.

At operation 1134, the connection update module 1130 creates a thread to update primary bias state on a secondary cluster 1150 and the primary storage cluster 1101. At operation 1136, the thread with the update of the primary bias state is sent to the N2 1120. At operation 1138, the N2 1120 pings the mediator 1102 on a periodic basis (e.g., every 1 to 3 seconds) to determine if connectivity to the mediator 1102 has been restored.

At operation 1142, the primary bias module 1140 sets an in-memory flag to indicate that the primary bias module is running in order to eliminate any duplicate task processing if possible that may arise from other storage nodes. A replicated database transaction is performed within the primary storage cluster as follows. The order of below operations 1 and 2 can be reversed.

1. Read connection status to the mediator and proceed only if the mediator is still not connected.
2. If planned failover (PFO) running, abort and retry.
3. Increment a local generation number in the RDB (e.g., generation 1) or create RDB if a first time call.

At operation 1144, the primary bias module 1140 sends a call to the secondary cluster 1150 to pass the generation number of the replicated database transaction. At operation 1146, the secondary cluster 1150 performs a replicated database transaction at the secondary cluster 1150. The transaction proceeds as follows.

1. Mediator is connected, reject the request (return and no retry).
2. If planned failover running, return and retry.
3. If RDB peer generation number greater than (or greater than or equal to) passed generation number (generation 1), reject the request (return and retry).
4. Set primary bias state, update peer generation number to generation 1. Start secondary cluster's primary bias state set module in secondary cluster to primary cluster direction.

At operation 1148, a call returns from the secondary cluster 1150 to the primary bias module 1140 of the primary storage cluster. At operation 1152, if the secondary cluster returned a retriable error at operation 1148, then abort and start the flow again. If the secondary cluster (peer) returned a success at operation 1148, then perform the following.

1. a replicated database transaction.
2. If mediator is connected, abort and no retry
3. If RDB generation number is not equal to generation 1, then abort and retry.
4. Set local primary bias state.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium (or computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium (or non-transitory computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 12:
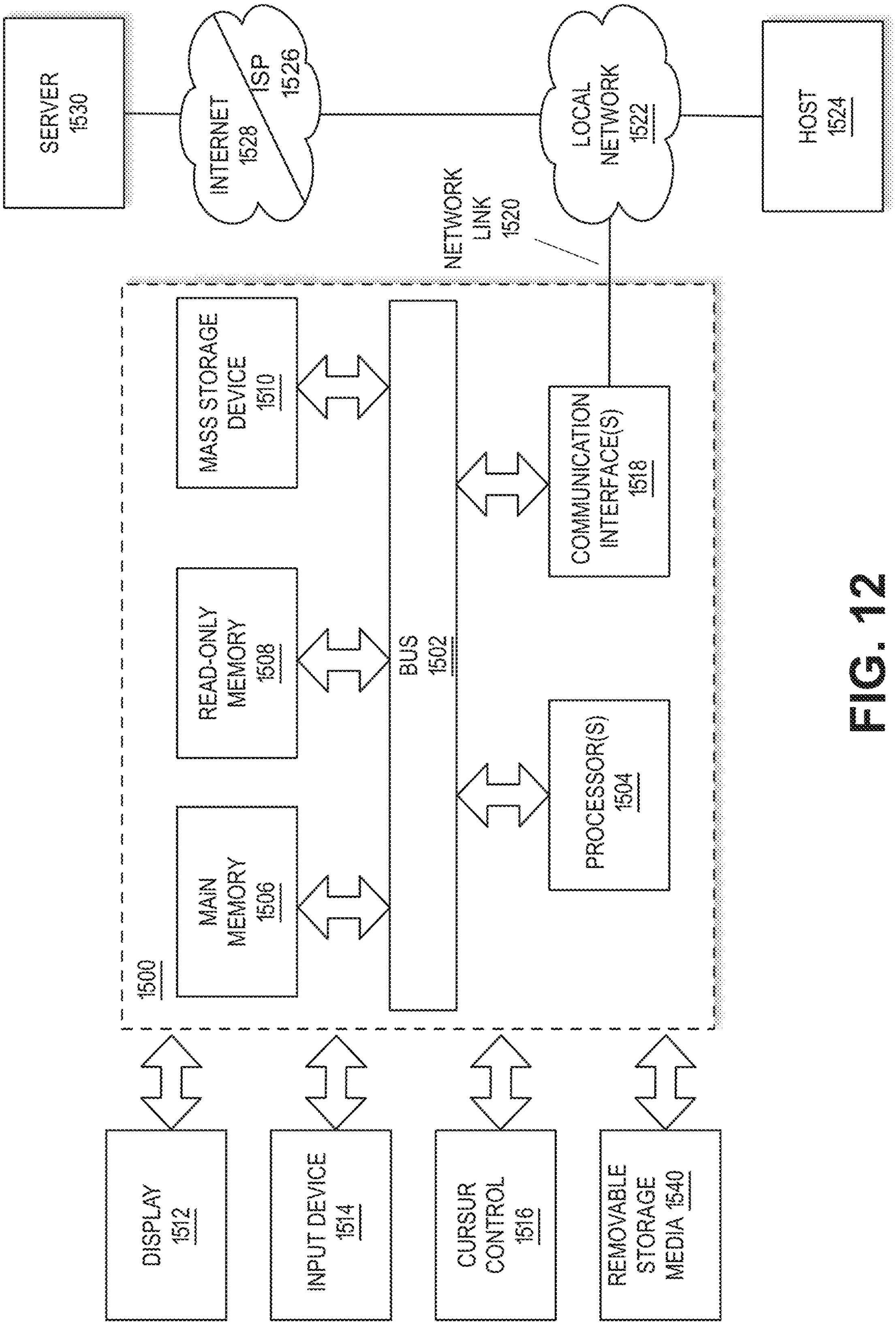
FIG. 12 illustrates an example computer system in which or with which embodiments of the present disclosure may be utilized.

FIG. 12 is a block diagram that illustrates a computer system 1500 in which or with which an embodiment of the present disclosure may be implemented. Computer system 1500 may be representative of all or a portion of the computing resources associated with a storage node (e.g., storage node 136*a-n*, storage node 146*a-n*, storage node 156*a-b*, storage node 236*a-n*, storage node 246*a-n*, nodes 311-312, nodes 321-322, nodes 356*a*-356*b*, storage node 400), a mediator (e.g., mediator 120, mediator 220, mediator 360), or an administrative workstation (e.g., computer system 110, computer system 210). Notably, components of computer system 1500 described herein are meant only to exemplify various possibilities. In no way should example computer system 1500 limit the scope of the present disclosure. In the context of the present example, computer system 1500 includes a bus 1502 or other communication mechanism for communicating information, and a processing resource (e.g., processing logic, hardware processor(s) 1504) coupled with bus 1502 for processing information. Hardware processor 504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, e.g., a magnetic disk, optical disk or flash disk (made of flash memory chips), is provided and coupled to bus 1502 for storing information and instructions.

Computer system 1500 may be coupled via bus 1502 to a display 1512, e.g., a cathode ray tube (CRT), Liquid Crystal Display (LCD), Organic Light-Emitting Diode Display (OLED), Digital Light Processing Display (DLP) or the like, for displaying information to a computer user. An input device 1514, including alphanumeric and other keys, is coupled to bus 1502 for communicating information and command selections to processor 1504. Another type of user input device is cursor control 1516, such as a mouse, a trackball, a trackpad, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Removable storage media 1540 can be any kind of external storage media, including, but not limited to, hard-drives, floppy drives, IOMEGA® Zip Drives, Compact Disc -Read Only Memory (CD-ROM), Compact Disc-Re-Writable (CD-RW), Digital Video Disk -Read Only Memory (DVD-ROM), USB flash drives and the like.

Computer system 1500 may implement the techniques described herein using customized hard-wired logic, one or more ASICs or FPGAs, firmware or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1510. Volatile media includes dynamic memory, such as main memory 1506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, a non-transitory computer-readable storage medium, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. The received code may be executed by processor 1504 as it is received, or stored in storage device 1510, or other non-volatile storage for later execution.

Figure 13:
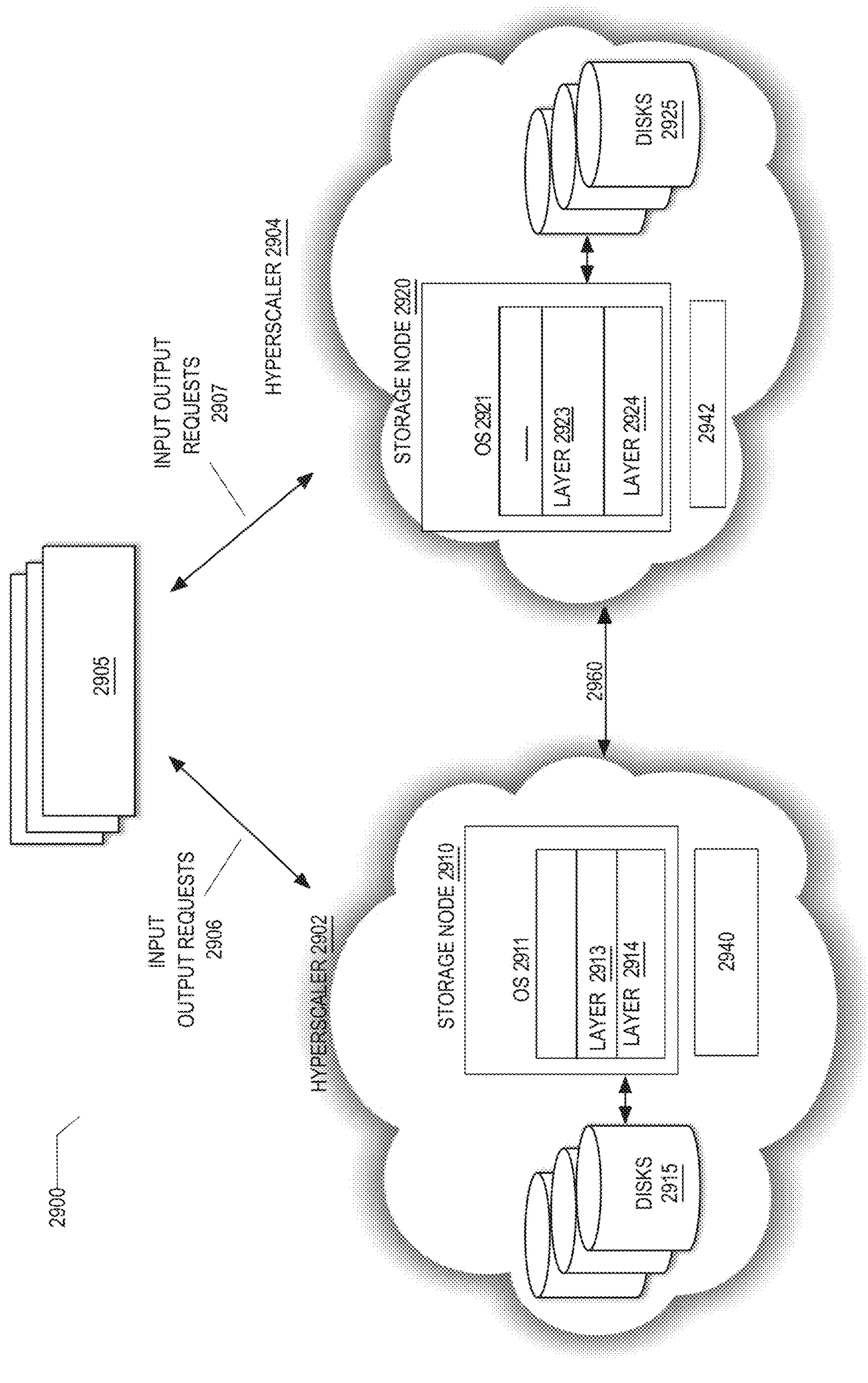
FIG. 13 is a block diagram illustrating a cloud environment in which various embodiments may be implemented (e.g., virtual storage nodes of a primary storage site, a secondary storage site, and a tertiary storage site).

FIG. 13 is a block diagram illustrating a cloud environment in which various embodiments may be implemented (e.g., virtual storage nodes of a primary storage site, a secondary storage site, and a tertiary storage site). In various examples described herein, a virtual storage system 2900 may be run (e.g., on a VM or as a containerized instance, as the case may be) within a public cloud provider (e.g., hyperscaler 2902, 2904). In the context of the present example, the virtual storage system 2900 includes virtual storage nodes 2910 and 2920 and makes use of cloud disks (e.g., hyperscale disks 2915, 2925) provided by the hyperscaler.

The virtual storage system 2900 may present storage over a network to clients 2905 using various protocols (e.g., object storage protocol (OSP), small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 2905 may request services of the virtual storage system 2900 by issuing Input/Output requests 2906, 2907 (e.g., file system protocol messages (in the form of packets) over the network). A representative client of clients 2905 may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the virtual storage system 2900 includes virtual storage nodes 2910 and 2920 with each virtual storage node being shown includes an operating system. The virtual storage node 2910 includes an operating system 2911 having layers 2913 and 2914 of a protocol stack for processing of object storage protocol operations or requests.

The virtual storage node 2920 includes an operating system 2921, layers 2923 and 2924 of a protocol stack for processing of object storage protocol operations or requests.

The storage nodes can include storage device drivers for transmission of messages and data via the one or more links 2960. The storage device drivers interact with the various types of hyperscale disks 2915, 2925 supported by the hyperscalers.

The data served by the virtual storage nodes may be distributed across multiple storage units embodied as persistent storage devices (e.g., non-volatile memory 2940, 2942), including but not limited to HDDs, SSDs, flash memory systems, or other storage devices (e.g., 2915, 2925).

METHODS AND SYSTEMS FOR ENHANCING HIGH-AVAILABILITY IN MEDIATOR-LESS DEPLOYMENTS IN A DISTRIBUTED STORAGE SYSTEM

A fully symmetric storage solution of the present disclosure allows simultaneous read-write access to both of a primary copy of data of a consistency group (CG1) of a primary storage site and a secondary copy of the data of a consistency group (CG2) of a secondary storage site. The fully symmetric storage solution provides bi-directional replication between CG1 and CG2, application-granular zero recovery point objective (ZRPO) data protection that prevents any data loss, and zero recovery time objective (ZRTO) transparent failover that provides instant recovery in the event of various faults. The fully symmetric storage solution optionally uses a mediator/tiebreaker deployed in a third site having a different fault domain than the primary and secondary storage site to provide quorum services to the distributed storage system to help prevent split-brain scenarios.

U.S. application Ser. No. 18/296,832, filed on Apr. 6, 2023, and incorporated by reference herein, provides an innovative design to deal with a mediator outage in a storage business continuity solution having unidirectional synchronous replication between the primary and secondary storage sites. The design is based on the concept of a Primary Bias mode, which is described above in paragraphs [00072]-[00146], in which one site has a pre-negotiated bias. This primary bias mode is activated when the mediator becomes unavailable, allowing the primary storage site to assume authority and prevent failover events. The design also includes a mechanism to handle potential race conditions in a highly fluctuating network environment.

This fully symmetric storage solution of the present disclosure describes an enhancement which extends the primary bias mode to handle mediator-less deployments. The present disclosure describes potential challenges, design, and interoperability with third-party monitoring solutions.

The primary bias helps improve storage availability of the distributed storage system by dealing with mediator unavailability on systems with mediator configured. Alternatively, for systems in which the mediator is not configured, the primary and secondary storage sites are the only quorum members. Upon storage or network faults, the consensus is derived by communication over one or more interconnect (IC) channels between the primary and secondary storage sites. However, in cases of network partition, with the one or more IC channels being down, consensus cannot be derived, and IO disruption will occur.

Note that Automatic Unplanned Failover (AUFO) functionality is available only when the mediator is configured and available. Hence, it is reasonable to think that a default consensus be provided to one of the sites (e.g., Primary storage site). However, there are some challenges with this naïve approach.

For a first issue, it can not be assumed that a mediator will never be configured on a distributed system. Once a mediator is configured, a default consensus for serving I/O operations must be obsoleted. Otherwise, this can lead to split-brain where a first site is having a default consensus, and a second site has a mediator consensus. Similarly, even if the mediator is initially configured, it can be subsequently unconfigured for various reasons. The distributed storage system should be able to handle various faults like network partition after this point.

Second, since there are multiple nodes in a storage cluster of a storage site, more than one storage node may detect the events of a mediator getting configured and unconfigured. Also, note that a mediator can get configured and unconfigured or vice versa in quick succession. These factors lead to race conditions, which if not handled properly can result in incorrect determination of a consensus and split brain.

Third, a planned failover operation can be performed in the absence of a mediator. This planned failover operation (PFO) swaps the primary and secondary roles from the primary and secondary storage site. If not handled properly, this PFO can result in a secondary site that originally had secondary role serving IO due to the role change and the primary storage site that originally had primary role serving IO due to a primary bias.

Fourth, it is possible that customers may use third party monitoring solutions which may initiate an explicit failover from the primary storage site to the secondary storage site in cases where a primary storage cluster of the primary storage site becomes unavailable. Now, if the primary cluster recovers, it can start serving IO if the primary cluster has a default consensus. These cases will cause IO corruption.

The fully symmetric storage solution of the present disclosure has new triggers for setting a primary bias mode to handle mediator-less deployment and for clearing a primary bias mode, handles race conditions, handles mediator-less failover, and provides interoperability with third-party monitoring services.

Figure 14:
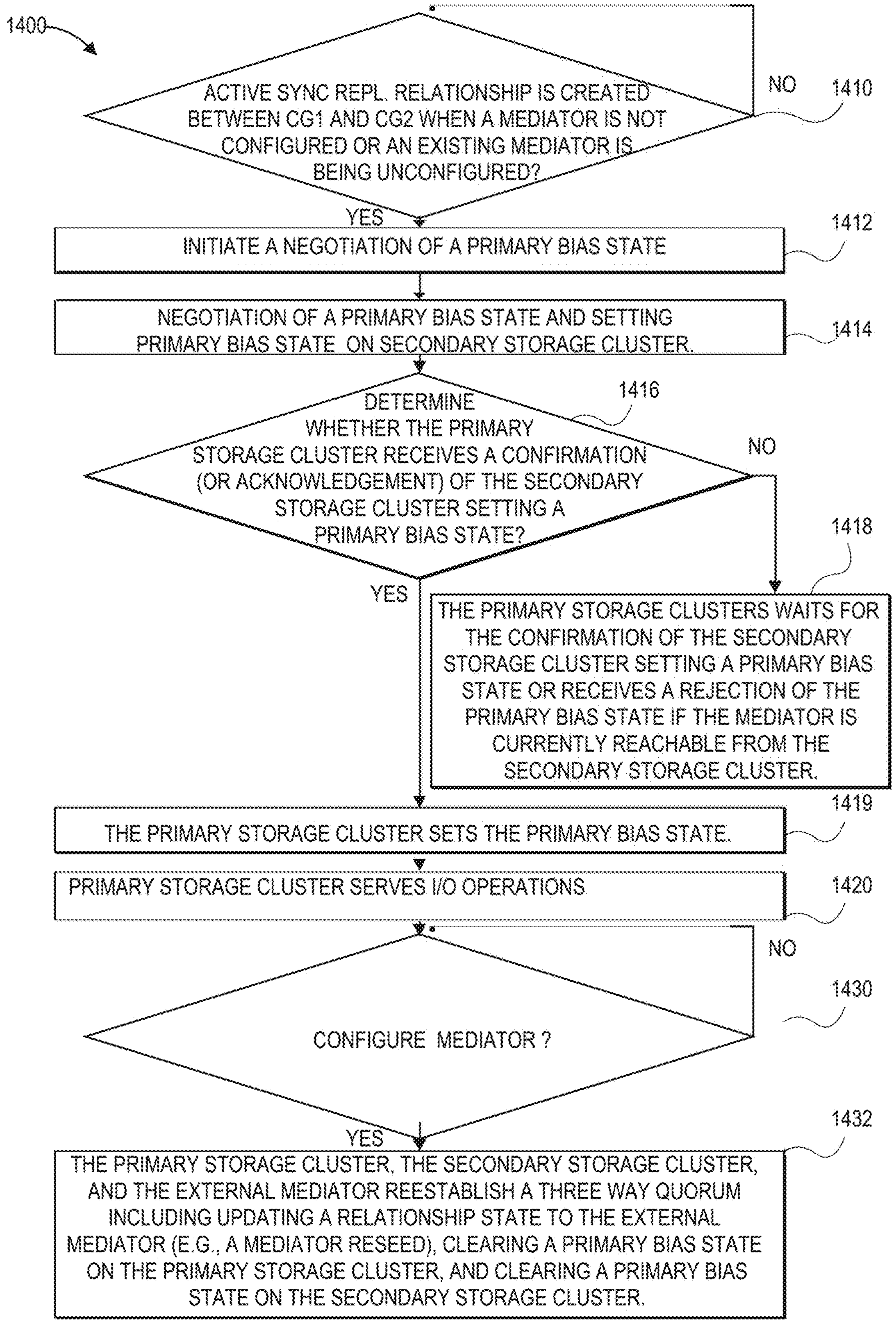
FIG. 14 is a flow diagram illustrating a computer-implemented method 1400 of operations for a primary bias mode (or primary bias state) for a mediator-less deployment that provides non-disruptiveness for an application (e.g., database application, email application) in accordance with an embodiment of the present disclosure.

FIG. 14 is a flow diagram illustrating a computer-implemented method 1400 of operations for a primary bias mode (or primary bias state) for a mediator-less deployment that provides non-disruptiveness for an application (e.g., database application, email application) in accordance with an embodiment of the present disclosure. As noted above, this primary bias mode of the present design provides an order of operations such that a primary copy of a primary storage site continues to serve I/O operations until a mirror copy of a secondary storage site is ready. This primary bias mode provides non-disruptiveness when an external mediator is not deployed or transitions from being configured to unconfigured—in presence of various failures including, but not limited to, network disconnection among different sites including a primary storage site, a secondary storage site, and the external mediator.

Although the operations in the computer-implemented method 1400 are shown in a particular order, the order of the actions can be modified. Thus, the illustrated embodiments can be performed in a different order, and some operations may be performed in parallel. Some of the operations listed in FIG. 14 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 1400 may be executed by a storage controller, a storage virtual machine (e.g., SVM 511*a*, SVM 511*b*), a multi-site distributed storage system, a computer system, a machine, a server, a web appliance, a centralized system, a storage node (e.g., 136*a-n*, 146*a-n*, 236*a-n*, 246*a-n*, 311, 312, 321, 322, 400), or any system, which includes processing logic (e.g., one or more processors, one or more processing resources). The processing logic may include hardware (circuitry, dedicated logic, etc.), software (such as is run on a general purpose computer system or a dedicated machine or a device), or a combination of both.

In one embodiment, a multi-site distributed storage system includes a primary storage cluster having a primary copy of data in one or more storage members of a first consistency group (CG1). The consistency group of the primary storage cluster is initially assigned a leader role. A secondary storage cluster has a mirror copy of the data of the primary copy in one or more storage members of a second consistency group. The consistency group of the secondary storage cluster (CG2) is initially assigned a follower role.

At operation 1410, the method detects whether an active synchronous replication relationship is created for bi-directional synchronous replication between CGs (e.g., CG1) of the primary storage site and CGs (e.g., CG2) of the secondary storage site when a mediator is not configured or detects whether an existing mediator is being unconfigured. If so, then the method initiates a negotiation of a primary bias state for CG1 (or all CGs of the primary and secondary storage sites) at operation 1412 to eventually set the primary bias. If not, then no primary bias is set and the method returns to operation 1410.

At operation 1414, the method includes negotiating a primary bias state and setting the primary bias state on a secondary storage cluster. This is an intermediate state of primary bias processing which guarantees that the secondary site will reject any failover actions or become failover incapable in other words. This intermediate state also serves as a way of the secondary site acknowledging the intention of the primary site to work in the biased mode.

At operation 1416, the method includes determining whether the primary storage cluster receives a confirmation (or acknowledgement) of the secondary storage cluster setting a primary bias state. If so, then the primary storage cluster sets the primary bias state at operation 1419.

If not, then at operation 1418 the primary storage clusters waits for the confirmation of the secondary storage cluster setting a primary bias state or receives a rejection of the primary bias state if the mediator is reachable from the secondary storage cluster. The following bias state can not occur:

primary storage cluster—sets a primary bias state while the secondary storage cluster does not set a primary bias state. The state is persistent.

A primary bias state can be implemented in a configuration database (e.g., persistent replicated database (RDB) 512*a*, 512*b*), which is available on all storage nodes of a storage cluster.

At operation 1420, for a primary bias state being set in the primary storage cluster and the secondary storage cluster, the primary storage cluster serves I/O operations for an application. A primary storage cluster is granted a consensus and this may occur in response to an out of sync state for a data replication relationship between a CG of the primary storage cluster and a peered CG of the secondary storage cluster.

At operation 1430, the method determines whether at least one of the primary storage cluster and the secondary storage cluster detect configuring of the external mediator. At operation 1432, if so, the primary storage cluster, the secondary storage cluster, and the external mediator reestablish a three way quorum including updating a relationship state to the external mediator (e.g., a mediator reseed), clearing a primary bias state on the primary storage cluster, and clearing a primary bias state on the secondary storage cluster. The method can implement a mechanism to clear a stale out of date primary bias state on the primary storage cluster or the secondary storage cluster. If no mediator is being configured, then the method returns to operation 1430.

The present design includes a mechanism to handle potential race conditions that could occur between the setting of the primary bias mode due to a mediator-less deployment and the configuration of the mediator. The primary bias set and clear processes are made atomic to ensure that only one process executes on a storage cluster at a time. Each processing instance increments a generation number stored in a replicated database and caches a value in the processing thread context of each storage cluster. The negotiated primary bias configuration is updated only if the cached value matches that in the replicated database at a time of final update. This ensures that the process did not encounter a race and hence the negotiation is sane, and the setting can be safely applied.

As previously discussed, the negotiation for the primary bias state is a two step process. The primary storage site has to first get an agreement from the secondary storage site that the secondary storage site will not participate in a failover event during and after the negotiation. This enables the primary storage site to safely assume authority to enter the primary bias mode.

FIGS. 15, 16A, 16B, 16C, 17A, 17B, and 17C illustrate computer-implemented methods of a negotiation process to handle race conditions for a first process to set a primary bias state and a second process to clear the primary bias state of a primary storage cluster based on a mediator-less deployment or changing from unconfigurable mediator to configurable mediator in accordance with one embodiment. The race conditions are handled through a replicated database serialization and use of generation indicator (e.g., generation number) to drop stale event flows.

When both storage clusters of the storage sites are able to communicate with a configurable mediator, the process to clear the primary bias state is started. The state is cleared when the storage clusters negotiate and agree with each other to work back in a normal mode where Failover operations and mediator as a tie-breaker is resumed. During the clear process. the primary bias state is first cleared on the primary storage cluster and then the state preventing failover on the secondary storage cluster is cleared.

The order of the transactions is important to maintain the same rules of engagement. The negotiation process also handles the race conditions for a first process to set a primary bias state and a second process to clear the primary bias state based on the configuration changes of a mediator. If configuration of the mediator is changing frequently, there is a high likelihood of race conditions where more than one storage node (e.g., node 712, node 714, node 752, node 754) of the storage cluster may be in the process of setting or clearing the primary bias state.

Figure 15:
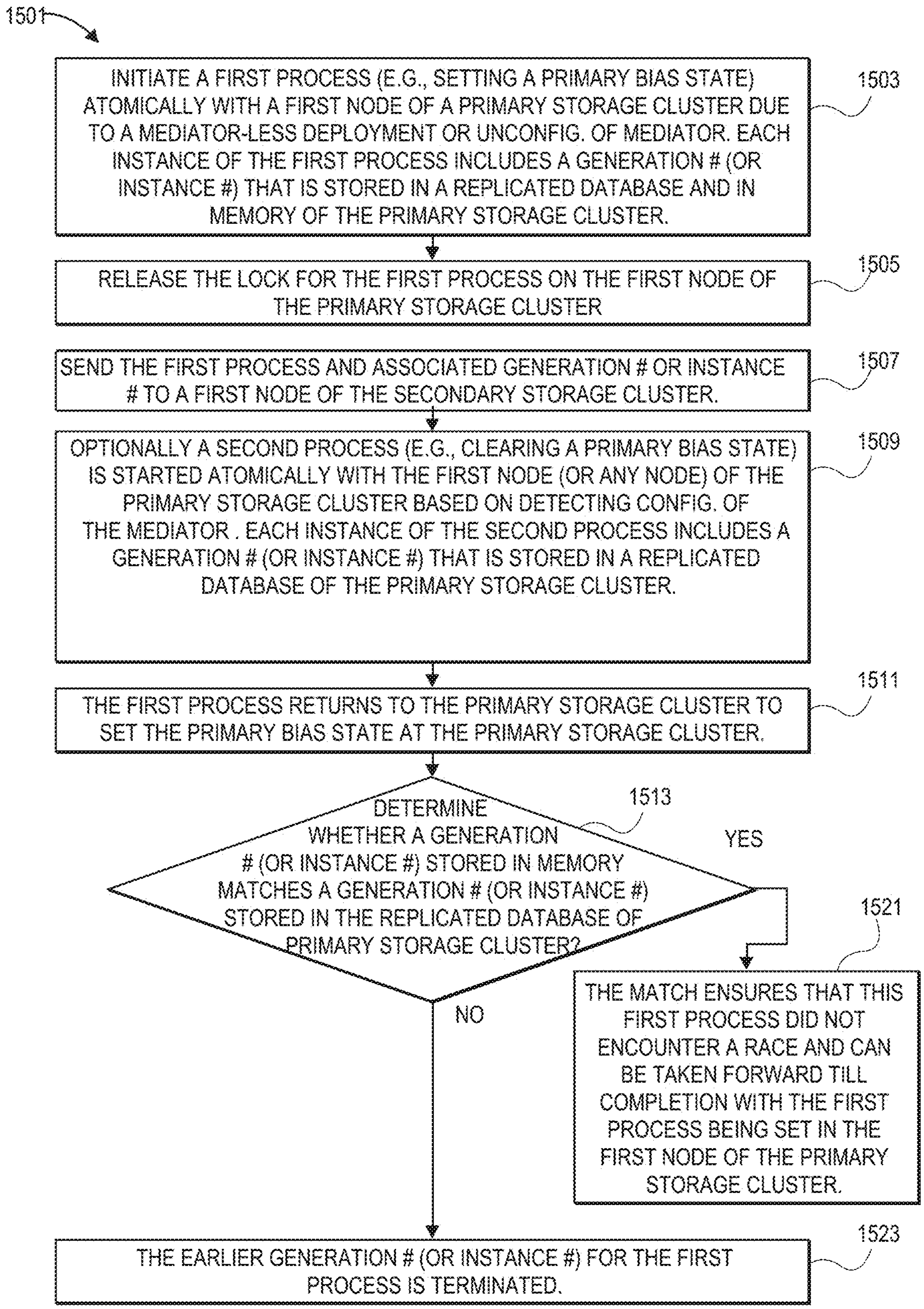
Figure 16A:
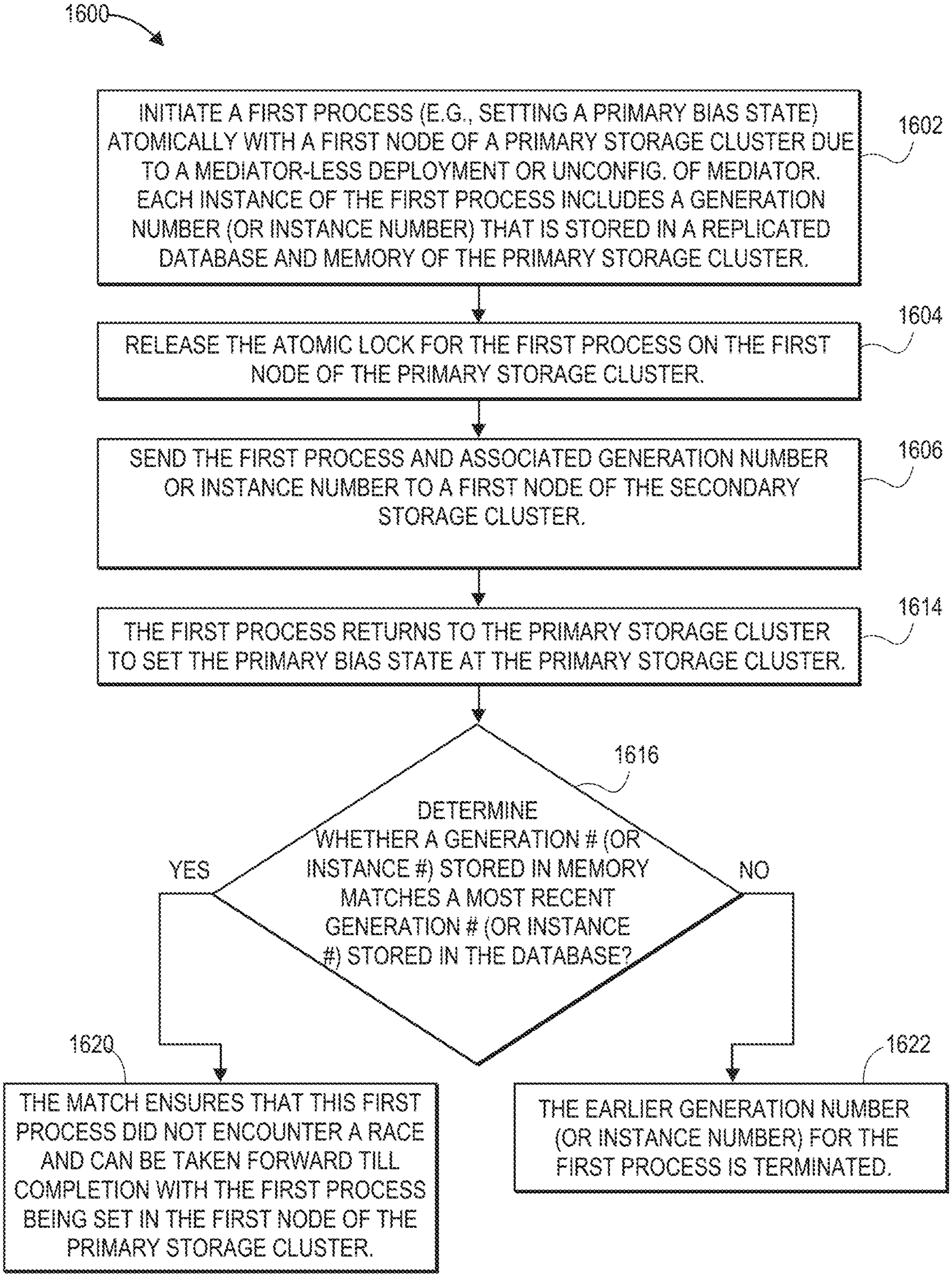
Figure 16B:
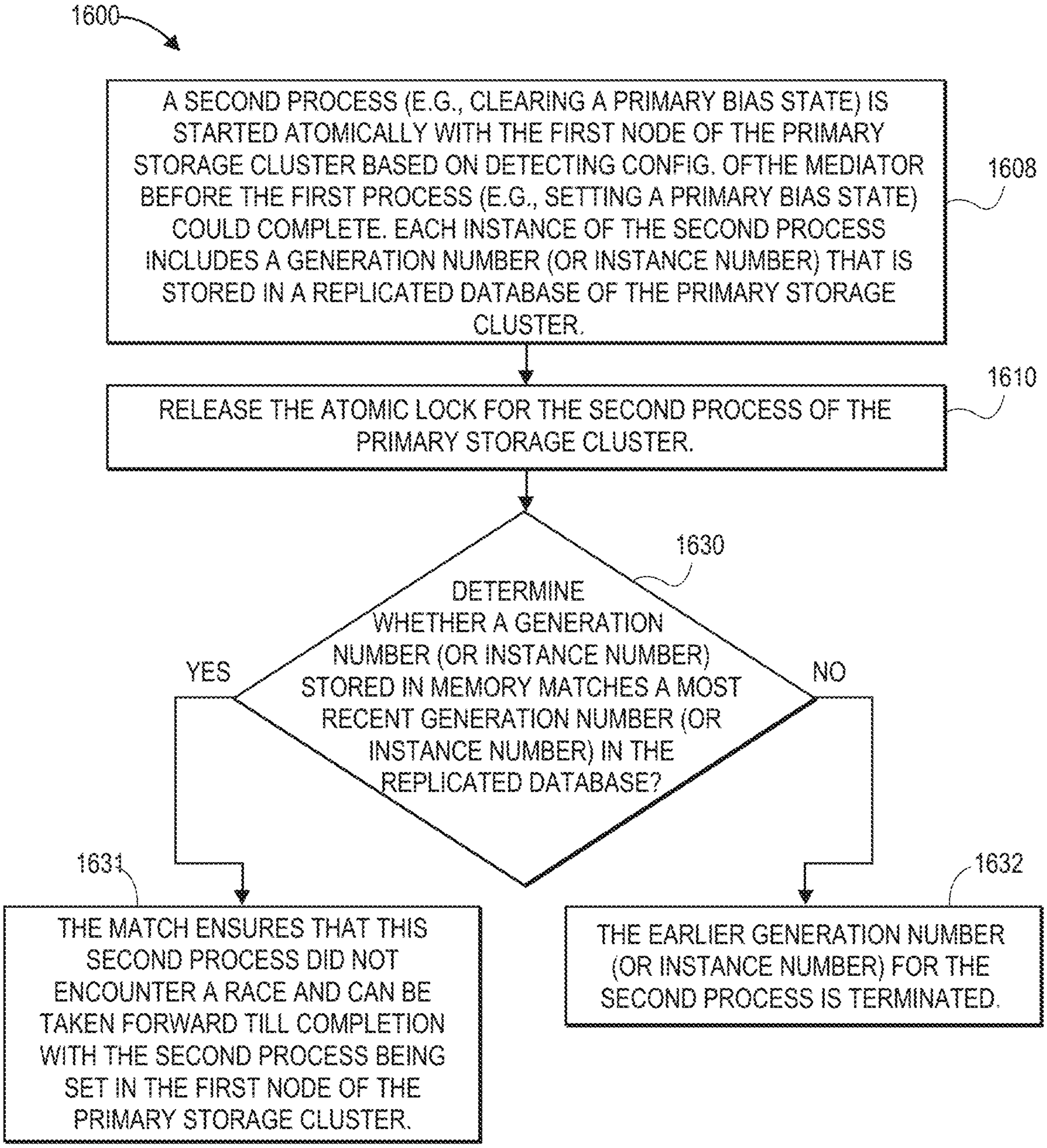

FIGS. 15, 16A, 16B, 16C, 17A, 17B, and 17C illustrate the following possible scenarios:

Set process started->clear process started before set process could complete (FIG. 15). Set process started->clear process started->another set process started before both the previous processes could complete (FIG. 16A, 16B, 16C). Set process started on node N1->clear process started->another set process started on node N2 before both the previous processes could complete (17A, 17B, and 17C).

From the above scenarios, it is evident that at the same time there can be more than one set or clear processes active in the distributed storage system and the distributed storage system needs a mechanism to serialize these processes. To achieve this, the set and clear processes are made atomic, that is at a time only one process will be executing on a storage cluster. But as mentioned earlier, setting and clearing both are two step processes. After doing the local processing inside a lock, the flow must go on the other storage cluster also and this leaves a window for other processes to come on the local cluster. As the latest process is generated from the current matching conditions, all the previous processes can be ignored and terminated. To achieve this, each instance of a process carries a generation indicator (e.g., generation number) or instance indicator (e.g., instance number) with it. Whenever the process starts to run, it checks for the matching conditions inside a lock and caches the generation number in memory of a storage cluster. When a process moves to the secondary storage cluster and returns to the local primary storage cluster, the process compares the cached generation indicator in memory with latest generation indicator stored persistently in a replicated database. A match between the cached generation indicator in memory of the primary storage cluster and the latest generation indicator stored persistently in a replicated database of the primary storage cluster ensures that this process did not encounter a race and can be taken forward till completion.

For operation 1503 of FIG. 15, the computer-implemented method 1501 includes initiating a first process (e.g., setting a primary bias state) atomically with a first storage node of a primary storage cluster due to a mediator-less deployment or a previously configured mediator being unconfigured. Each instance of the first process includes a generation indicator number (or instance indicator) that is stored in a replicated database of the primary storage cluster and also stored in memory of the primary storage cluster. At operation 1505, the computer-implemented method releases the atomic lock for the first process on the first storage node of the primary storage cluster. At operation 1507, the computer-implemented method sends the first process and associated generation indicator (e.g., generation number) or instance indicator (e.g., instance number) to a first storage node of the secondary storage cluster, which will handle the first process (e.g., setting a primary bias state).

At operation 1509, optionally a second process (e.g., clearing a primary bias state) is started atomically with the first storage node (or any node) of the primary storage cluster based on detecting configuration of the mediator. Each instance of the second process includes a generation number (or instance number) that is stored in the replicated database of the primary storage cluster. A first generation number of the first process can be initially stored in the replicated database and then the first generation number can be incremented or replaced in the replicated database with a second generation number of the second process.

At operation 1511, the first process returns to the primary storage cluster to set the primary bias state at the primary storage cluster. At operation 1513, the computer-implemented method determines whether the generation number (e.g., first generation number) stored in memory of the primary storage cluster matches the latest generation number (e.g., first generation number if second process does not initiate, second generation number if second process does initiate) that has been stored in the replicated database of the primary storage cluster.

If a generation number (or instance number) stored in the memory matches a generation number (or instance number) stored in the replicated database of the primary storage cluster, then the match ensures that this process did not encounter a race and can be taken forward till completion with the first process being set in the first node of the primary storage cluster at operation 1521.

If a generation number (or instance number) stored in the memory does not match a latest or most recent generation number (or instance number) stored in the replicated database of the primary storage cluster, then the earlier generation number (or instance number) for the first process is terminated at operation 1523.

For operation 1602 of FIG. 16A, the computer-implemented method 1600 includes initiating a first process (e.g., setting a primary bias state) atomically with a first node of a primary storage cluster due to a mediator-less deployment or a previously configured mediator being unconfigured. Each instance of the first process includes a generation number (or instance number) that is stored in a replicated database of the primary storage cluster and also stored in memory of the primary storage cluster. At operation 1604, the computer-implemented method releases the atomic lock for the first process on the first node of the primary storage cluster. At operation 1606, the computer-implemented method sends the first process and associated generation number or instance number to a first node of the secondary storage cluster, which will handle the first process (e.g., setting a primary bias state).

At operation 1608 as illustrated in FIG. 16B, a second process (e.g., clearing a primary bias state) is started atomically with the first node of the primary storage cluster based on detecting configuration of the mediator before the first process (e.g., setting a primary bias state) could complete. Each instance of the second process includes a generation number (or instance number) that is stored in a replicated database of the primary storage cluster. A first generation number of the first process can be initially stored in the replicated database and then the first generation number can be incremented or replaced in the replicated database with a second generation number of the second process.

At operation 1610, the computer-implemented method releases the atomic lock for the second process of the primary storage cluster.

Figure 17A:
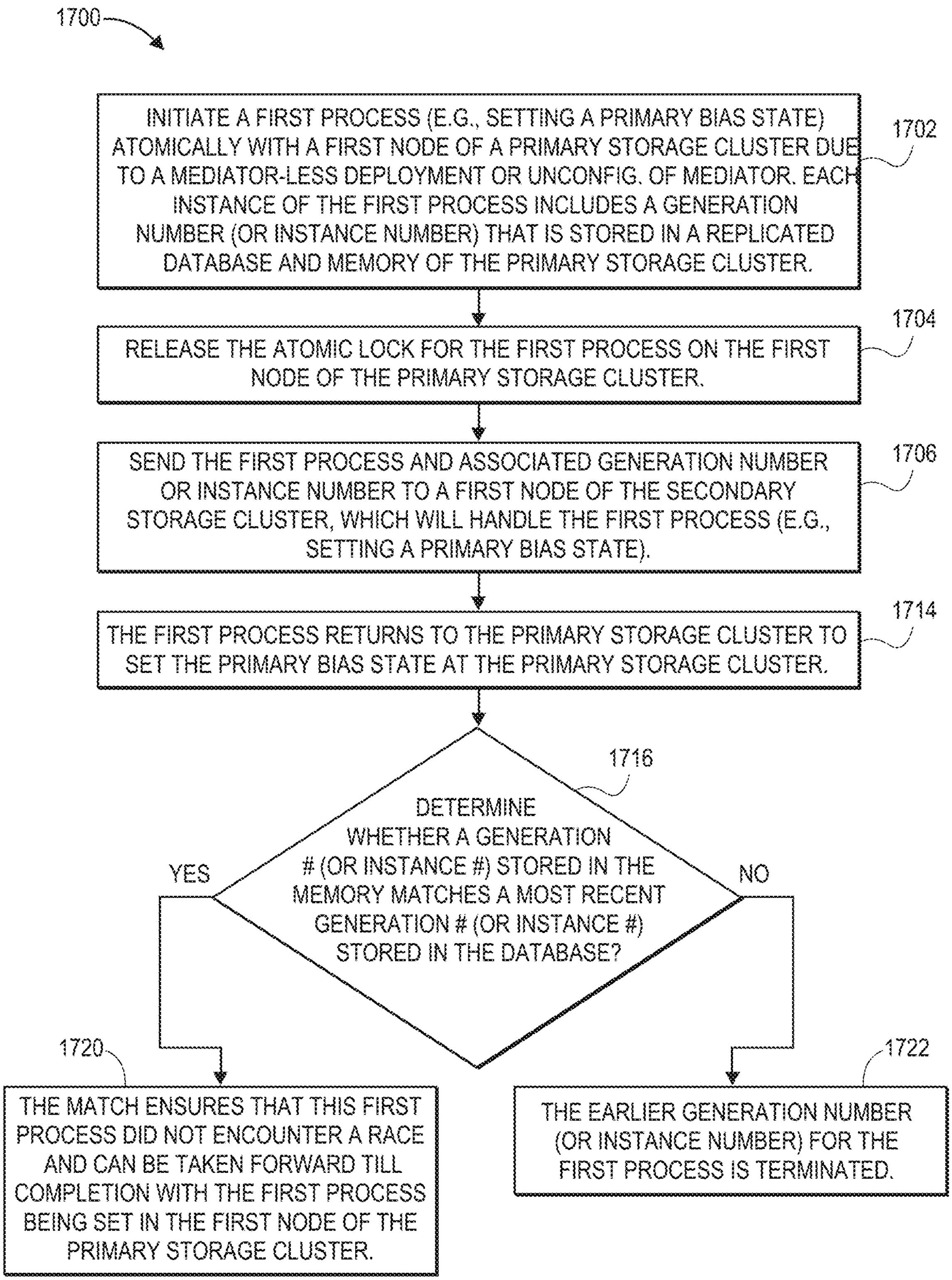
Figure 17B:
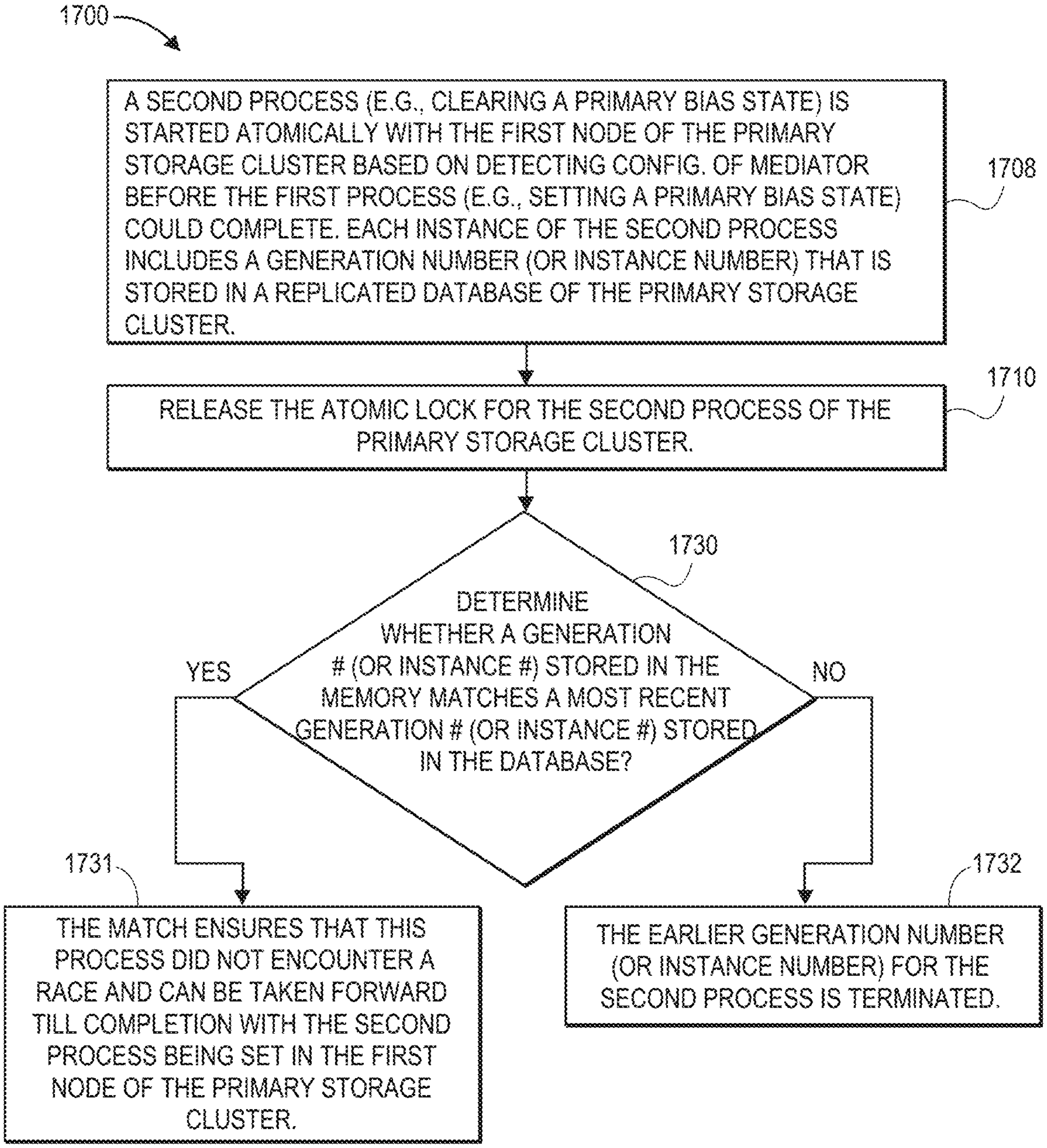
Figure 17C:
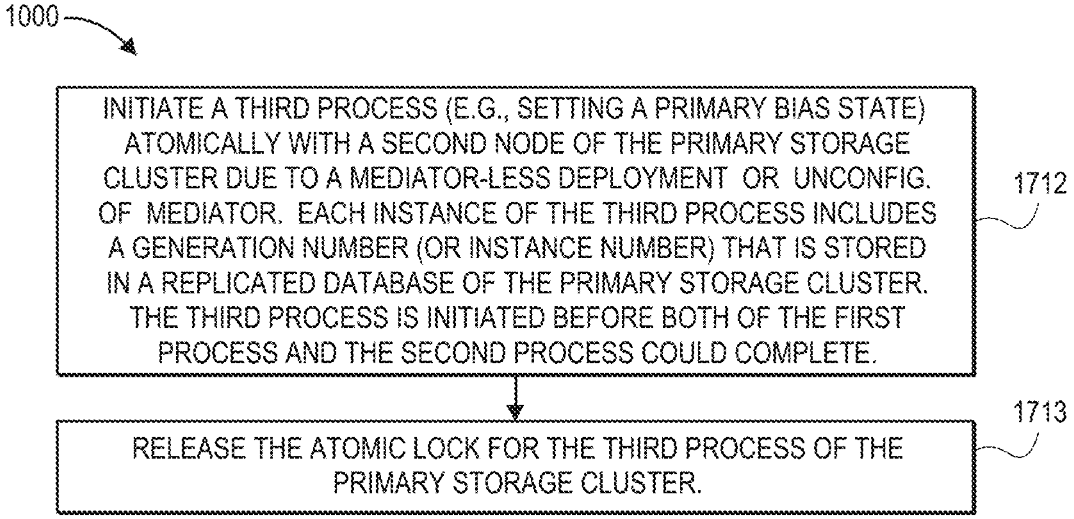

For operation 1612 as illustrated in FIG. 17C, the computer-implemented method includes initiating a third process (e.g., setting a primary bias state) atomically with the first node of a primary storage cluster due to a mediator-less deployment or a previously configured mediator being unconfigured. Each instance of the third process includes a generation number (or instance number) that is stored in a replicated database of the primary storage cluster. In one example, the third process is initiated before both of the first process and the second processes could complete. At operation 1613, the computer-implemented method releases the atomic lock for the third process of the primary storage cluster.

At operation 1614 (returning to FIG. 16A), the first process returns to the primary storage cluster to set the primary bias state at the primary storage cluster. At operation 1616, the computer-implemented method determines whether a generation number (or instance number) stored in memory matches a most recent generation number (or instance number) that has been stored in the replicated database of the primary storage cluster.

If a generation number (or instance number) stored in memory matches a most recent generation number (or instance number) in the replicated database of the primary storage cluster, then the match ensures that this process did not encounter a race and can be taken forward till completion with the first process being set in the first node of the primary storage cluster at operation 1620.

If a generation number (or instance number) stored in memory does not match a most recent generation number (or instance number) in the replicated database of the primary storage cluster, then the earlier generation number (or instance number) for the first process is terminated at operation 1622.

At operation 1630 (returning to FIG. 16B), the computer-implemented method determines whether a generation number (or instance number) stored in memory matches a most recent generation number (or instance number) that has been stored in the replicated database of the primary storage cluster.

If a generation number (or instance number) stored in the memory matches a most recent generation number (or instance number) in the replicated database, then the match ensures that this process did not encounter a race and can be taken forward till completion with the second process being set in the first node of the primary storage cluster at operation 1631.

If a generation number (or instance number) stored in memory does not match a most recent generation number (or instance number) stored in the replicated database, then the earlier generation number (or instance number) for the second process is terminated at operation 1632.

For operation 1702 of FIG. 17A, the computer-implemented method 1700 includes initiating a first process (e.g., setting a primary bias state) atomically with a first node of a primary storage cluster due to a mediator-less deployment or a previously configured mediator being unconfigured. Each instance of the first process includes a generation number (or instance number) that is stored in a replicated database and in memory of the primary storage cluster. At operation 1704, the computer-implemented method releases the atomic lock for the first process on the first node of the primary storage cluster. At operation 1706, the computer-implemented method sends the first process and associated generation number or instance number to a first node of the secondary storage cluster, which will handle the first process (e.g., setting a primary bias state).

At operation 1708 of FIG. 17B, a second process (e.g., clearing a primary bias state) is started atomically with the first node of the primary storage cluster based on detecting configuration of the mediator before the first process (e.g., setting a primary bias state) could complete. Each instance of the second process includes a generation number (or instance number) that is stored in a replicated database of the primary storage cluster. At operation 1710, the computer-implemented method releases the atomic lock for the second process of the primary storage cluster.

For operation 1712 of FIG. 17C, the computer-implemented method includes initiating a third process (e.g., setting a primary bias state) atomically with a second node of the primary storage cluster due to a mediator-less deployment or a previously configured mediator being unconfigured. Each instance of the third process includes a generation number (or instance number) that is stored in a replicated database of the primary storage cluster. In one example, the third process is initiated before both of the first process and the second process could complete.

At operation 1713, the computer-implemented method releases the atomic lock for the third process of the primary storage cluster.

At operation 1714 of FIG. 17A, the first process returns to the primary storage cluster to set the primary bias state at the primary storage cluster. At operation 1716, the computer-implemented method determines whether a generation number (or instance number) stored in the memory matches a most recent generation number (or instance number) that has been stored in the replicated database of the primary storage cluster.

If a generation number (or instance number) stored in the memory matches a most recent generation number (or instance number) stored in the replicated database, then the match ensures that this process did not encounter a race and can be taken forward till completion with the first process being set in the first node of the primary storage cluster at operation 1720.

If a generation number (or instance number) stored in the memory does not match a most recent generation number (or instance number) stored in the replicated database, then the earlier generation number (or instance number) for the first process is terminated at operation 1722.

At operation 1730 (returning to FIG. 17B), the computer-implemented method determines whether a generation number (or instance number) stored in memory matches a most recent generation number (or instance number) that has been stored in the replicated database of the primary storage cluster.

If a generation number (or instance number) stored in memory matches a most recent generation number (or instance number) stored in the replicated database, then the match ensures that this process did not encounter a race and can be taken forward till completion with the second process being set in the first node of the primary storage cluster at operation 1731.

If a generation number (or instance number) stored in memory does not match a most recent generation number (or instance number) stored in the replication database, then the earlier generation number (or instance number) for the second process is terminated at operation 1732.

For handling mediator-less failover, this design provides primary bias and mediator-less failover as being mutually exclusive to each other. This is enforced by mandating that a new storage policy (e.g., Mediator Less Active Sync) or policy setting (e.g., is-mediator-less-cg) be used to enable mediator-less failover. Mediator configuration and primary bias will not be enabled for such CGs. Conversely, mediator-less failover functionality will not be available for CGs with regular ActiveSync policies.

As previously mentioned, third party monitoring solutions can initiate an explicit failover to a secondary storage cluster in cases where a primary storage cluster becomes unavailable. As of today, such a failover is not a workflow orchestrated by the fully symmetric storage solution. Rather, this enforces that the SMAS relationship be deleted using a force option before the secondary can start serving IO. The delete of the SMAS relationship will force the secondary LUNs to be unmapped and their identities to be restamped. With that the primary and secondary LUNs become independent of each other. For this reason, even if the primary cluster comes back and serves IO since primary-bias is set, it cannot result in data inconsistency.

Figure 18:
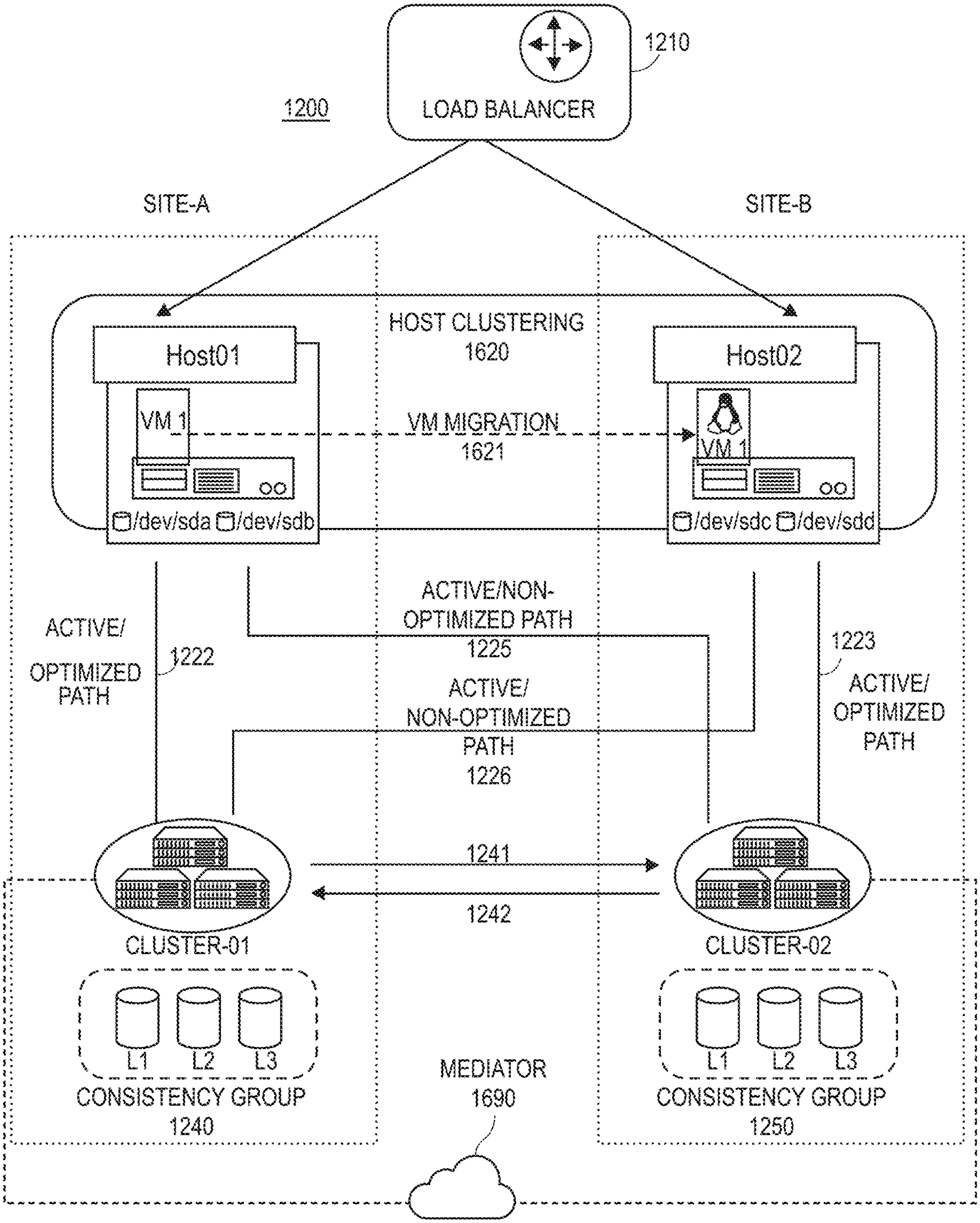
FIG. 18 is a block diagram illustrating a virtualized environment in which various embodiments may be implemented (e.g., virtual storage nodes of a primary storage site, a secondary storage site, etc.).

FIG. 18 is a block diagram illustrating a virtualized environment in which various embodiments may be implemented (e.g., virtual storage nodes of a primary storage site, a secondary storage site, etc.). In various examples described herein, a virtual storage system 1200 may be run (e.g., on a VM or as a containerized instance, as the case may be) within a public cloud provider. In the context of the present example, the virtual storage system 1200 includes a management server appliance 1210, a host clustering 1220 that includes host 01 and a host 02, and clusters 01 and 02. Cluster 01 includes a consistency group 1240 with L1, L2, and L3 storage members. Cluster 02 includes a consistency group 1250 with L1, L2, and L3 storage members.

To create a virtualized high availability host clustering 1220 across two sites A and B, hosts are used and managed by a server appliance 1210. The virtual machine (VM-1) can be migrated with VM migration 1621 from host 01 to host 02. The server appliance 1210 is a centralized management system that enables administrators to effectively operate hosts in host clusters. The server appliance 1210 facilitates key functions such as VM provisioning, High Availability (HA), Distributed Resource Scheduler (DRS), Kubernetes Grid, and more. It is an important component in cloud environments.

The virtual storage system 1200 provides advanced business continuity if one or more failure domains suffer a total outage. The virtual storage system 1200 may present storage over a network to clients using various protocols (e.g., object storage protocol (OSP), small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients may request services of the virtual storage system by issuing Input/Output requests (e.g., file system protocol messages (in the form of packets) over the network). A representative client may comprise an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the context of the present example, the clusters 01 and 02 each include virtual storage nodes with each virtual storage node including an operating system. The storage nodes can include storage device drivers for transmission of messages and data via the one or more links 1241 and 1242.

The data served by the virtual storage nodes may be distributed across multiple storage units embodied as persistent storage devices (e.g., non-volatile memory), including but not limited to HDDs, SSDs, flash memory systems, or other storage devices.

The clusters 01 and 02 enable business services to continue operating even through a complete site failure, supporting applications to fail over transparently using a secondary copy. Neither manual intervention nor custom scripting are required to trigger a failover with active sync. The active sync supports a symmetric active capability, enabling read and write I/O operations from both copies of a protected LUN (e.g., L1, L2, L3) with bidirectional synchronous replication, enabling both LUN copies to serve I/O operations locally.

A data protection relationship to protect for business continuity is created between the source storage system (e.g., cluster 01) and destination storage system (e.g., cluster 02), by adding the application specific LUNs from different volumes within a storage virtual machine (SVM) to the consistency group. Under normal operations, the enterprise application writes to the primary consistency group (e.g., CG 1240), which synchronously replicates this I/O to the mirror consistency group (e.g., CG 1250). Even though two separate copies of the data exist in the data protection relationship, because active sync maintains the same LUN identity, the application host sees this as a shared virtual device with multiple paths (e.g., active/optimized paths 1222, 1223; active/non-optimized path 1225, 1226) while only one LUN copy is being written to at a time. Active Optimized paths are a path state in ALUA (Asymmetric Logical Unit Access) where the target storage system responds to I/O requests using the most efficient path. In this case, the active/optimized path 1222 is between host 01 and cluster 01 at site A while the active/optimized path 1223 is between host 02 and cluster 02 at site B. The active non-optimized paths 1225 and 1226 are between different sites. This results in higher performance and reduced latency.

When a failure renders the primary storage system offline, the operating system detects this failure and uses the Mediator 1690 for reconfirmation. If neither the operating system nor the Mediator 1690 are able to ping the primary site with cluster 01, the operating system performs the automatic failover operation. This process results in failing over only a specific application without the need for the manual intervention or scripting which was previously required for the purpose of failover.

The external Mediator 1690 is external from sites A and B and installed in a third failure domain, distinct from the two distinct failure domains of the clusters 01 and 02. The Mediator 1690 acts as a passive witness to active sync copies. In the event of a network partition or unavailability of one copy, active sync uses Mediator 1690 to determine which copy continues to serve I/O, while discontinuing I/O on the other copy. The Mediator 1690 plays a crucial role in active sync configurations as a passive quorum witness, ensuring quorum maintenance and facilitating data access during failures. It acts as a ping proxy for controllers to determine liveliness of peer controllers. Although the Mediator does not actively trigger switchover operations, it provides a vital function by allowing the surviving node to check its partner's status during network communication issues. In its role as a quorum witness, the Mediator provides an alternate path (effectively serving as a proxy) to the peer cluster.

Furthermore, the Mediator allows clusters to get this information as part of the quorum process. The Mediator 1690 utilizes the node management LIF and cluster management LIF for communication purposes. The Mediator 1690 establishes redundant connections through multiple paths to differentiate between site failure and InterSwitch Link (ISL) failure. When a cluster loses connection with the Mediator software and all its nodes due to an event, it is considered not reachable. This triggers an alert and enables automated failover to the mirror Consistency Group (CG) in the secondary site, ensuring uninterrupted I/O for the client. The replication data path relies on a heartbeat mechanism, and if a network glitch or event persists beyond a certain period, it can result in heartbeat failures, causing the relationship to go out-of-sync. However, the presence of redundant paths, such as LIF failover to another port, can sustain the heartbeat and prevent such disruptions.

Some embodiments relate to Example 1 that is a computer-implemented method executed by one or more processing resources, comprising detecting, with a primary storage site or a secondary storage site of a multi-site storage system, whether an active synchronous replication relationship is created for bi-directional synchronous replication between a first consistency group (CG1) of one or more storage members of the primary storage site and a second consistency group (CG2) of one or more storage members of the secondary storage site when a mediator is not configured for a mediator-less deployment or when an existing mediator is being unconfigured with the mediator located remotely from the primary storage site and remotely from the secondary storage site and negotiating a primary bias state and setting the primary bias state on a secondary storage cluster of the secondary storage site upon the active synchronous replication relationship being created with no configured mediator or when the existing mediator is unconfigured.

Example 2 includes the subject matter of Example 1, the computer-implemented method further comprises determining whether a primary storage cluster of the primary storage site receives a confirmation of the secondary storage cluster setting the primary bias state and setting the primary bias state on the primary storage cluster when the primary storage cluster receives the confirmation.

Example 3 includes the subject matter of any of Examples 1-2, the computer-implemented method further comprises waiting for a confirmation of the secondary storage cluster setting a primary bias state or receiving a rejection of the primary bias state if the mediator is configured and communicatively reachable from the secondary storage cluster.

Example 4 includes the subject matter of any of Examples 1-3, the computer-implemented method further comprises detecting, with at least one of a primary storage cluster of the primary storage site and the secondary storage cluster, configuration of a mediator and establishing, with the primary storage cluster, the secondary storage cluster, and the mediator, a three way quorum including updating a relationship state to the mediator and clearing the primary bias state on the primary storage cluster and the secondary storage cluster.

Example 5 includes the subject matter of any of Examples 1-4, wherein setting the primary bias state comprises a first process that is atomic to ensure that only one process executes on the primary storage cluster or the secondary storage cluster at a time, wherein clearing the primary bias state comprises a second process that is atomic to ensure that only one process executes on the primary storage cluster or the secondary storage cluster at a time.

Example 6 includes the subject matter of any of Examples 1-5, wherein for each process, each processing instance increments a generation number stored in a replicated database and caches a value of the generation number in memory of each storage cluster, wherein configuration for the negotiated primary bias state is updated only if the cached value of the generation number matches a generation number in the replicated database during an update.

Example 7 includes the subject matter of any of Examples 1-6, wherein the primary bias state and a mediator-less failover between the primary and secondary storage sites are mutually exclusive to each other.

Example 8 includes the subject matter of any of Examples 1-7, the computer-implemented method further comprises detecting a failover of a third party monitoring solution between a primary storage cluster of the primary storage site and the secondary storage cluster, removing the active synchronous replication relationship between the CG1 and the CG2 upon detecting the failover of a third party monitoring solution, and unmapping one or more logical unit numbers for the one or more storage members of CG2 based upon removing the active synchronous replication relationship between the CG1 and the CG2.

Some embodiments relate to Example 9 that includes a multi-site storage system comprising one or more processing resources and a non-transitory computer-readable medium coupled to the one or more processing resources, having stored therein instructions, which when executed by the one or more processing resources cause the one or more processing resources to detect whether an active synchronous replication relationship is created for bi-directional synchronous replication between a first consistency group (CG1) of one or more storage members of a primary storage site and a second consistency group (CG2) of one or more storage members of a secondary storage site when a mediator is not configured for a mediator-less deployment or when an existing mediator is being unconfigured with the mediator located remotely from the primary storage site and remotely from the secondary storage site and negotiating a primary bias state and setting the primary bias state on a secondary storage cluster of the secondary storage site upon the active synchronous replication relationship being created for the mediator-less deployment or when the existing mediator is unconfigured.

Example 10 includes the subject matter of Example 9, wherein the instructions when executed by the one or more processing resources cause the one or more processing resources to determine whether a primary storage cluster of the primary storage site receives a confirmation of the secondary storage cluster setting the primary bias state and set the primary bias state on the primary storage cluster when the primary storage cluster receives the confirmation.

Example 11 includes the subject matter of any of Examples 9-10, wherein the instructions when executed by the one or more processing resources cause the one or more processing resources to detect, with at least one of a primary storage cluster of the primary storage site and the secondary storage cluster, configuration of a mediator and establish, with the primary storage cluster, the secondary storage cluster, and the mediator, a three way quorum including updating a relationship state to the mediator and clearing the primary bias state on the primary storage cluster and the secondary storage cluster.

Example 12 includes the subject matter of any of Examples 9-11, wherein setting the primary bias state comprises a first process that is atomic to ensure that only one process executes on a primary storage cluster or the secondary storage cluster at a time, wherein clearing the primary bias state comprises a second process that is atomic to ensure that only one process executes on the primary storage cluster or the secondary storage cluster at a time.

Example 13 includes the subject matter of any of Examples 9-12, wherein for each process, each processing instance increments a generation number stored in a replicated database and caches a value of the generation number in memory of each storage cluster, wherein configuration for the negotiated primary bias state is updated only if the cached value of the generation number matches a generation number in the replicated database during an update.

Example 14 includes the subject matter of any of Examples 9-13, wherein the primary bias state and a mediator-less failover between the primary and secondary storage sites are mutually exclusive to each other.

Example 15 includes the subject matter of any of Examples 9-14, wherein the instructions when executed by the one or more processing resources cause the one or more processing resources to detect a failover of a third party monitoring solution between a primary storage cluster of the primary storage site and the secondary storage cluster, remove the active synchronous replication relationship between the CG1 and the CG2 upon detecting the failover of a third party monitoring solution, and unmap one or more logical unit numbers for the one or more storage members of CG2 based upon removing the active synchronous replication relationship between the CG1 and the CG2.

Some embodiments relate to Example 16 that includes a non-transitory computer-readable storage medium embodying a set of instructions, which when executed by one or more processing resources of a multi-site storage system cause the one or more processing resources to detect whether an active synchronous replication relationship is created for bi-directional synchronous replication between a first consistency group (CG1) of one or more storage members of a primary storage cluster of a primary storage site and a second consistency group (CG2) of one or more storage members of a secondary storage cluster of a secondary storage site when a mediator is not configured for a mediator-less deployment or when an existing mediator is being unconfigured with the mediator located remotely from the primary storage site and remotely from the secondary storage site and negotiate a primary bias state and setting the primary bias state on a secondary storage cluster of the secondary storage site upon the active synchronous replication relationship being created for the mediator-less deployment or when the existing mediator is unconfigured.

Example 17 includes the subject matter of Example 16, wherein the instructions when executed by the one or more processing resources cause the one or more processing resources to detect, with at least one of a primary storage cluster of the primary storage site and the secondary storage cluster, configuration of a mediator and establish, with the primary storage cluster, the secondary storage cluster, and the mediator, a three way quorum including updating a relationship state to the mediator and clearing the primary bias state on the primary storage cluster and the secondary storage cluster.

Example 18 includes the subject matter of any of Examples 16-17, wherein setting the primary bias state comprises a first process that is atomic to ensure that only one process executes on the primary storage cluster or the secondary storage cluster at a time, wherein clearing the primary bias state comprises a second process that is atomic to ensure that only one process executes on the primary storage cluster or the secondary storage cluster at a time.

Example 19 includes the subject matter of any of Examples 16-18, wherein the primary bias state and a mediator-less failover between the primary and secondary storage sites are mutually exclusive to each other.

Example 20 includes the subject matter of any of Examples 16-19, wherein the instructions when executed by the one or more processing resources cause the one or more processing resources to detect a failover of a third party monitoring solution between a primary storage cluster of the primary storage site and the secondary storage cluster, remove the active synchronous replication relationship between the CG1 and the CG2 upon detecting the failover of a third party monitoring solution, and unmap one or more logical unit numbers for the one or more storage members of CG2 based upon removing the active synchronous replication relationship between the CG1 and the CG2.

The invention claimed is:

1. A computer-implemented method executed by one or more processing resources, comprising:

detecting, with a primary storage site or a secondary storage site of a multi-site storage system, that a bi-directional synchronous replication relationship for a mediator-less deployment exists between a first consistency group of one or more storage members of the primary storage site and a second consistency group of one or more storage members of the secondary storage site to allow simultaneous read-write access to both of a primary copy of data of the first group of the one or more storage members of the primary storage site initially having a primary role for serving input/output (I/O) operations and a secondary copy of the data of the second group of the one or more storage members of the secondary storage site initially have a secondary role for serving I/O operations; and negotiating a primary bias state and setting the primary bias state on a secondary storage cluster of the secondary storage site in response to the active bi-directional synchronous replication relationship being detected for the mediator-less deployment wherein planned or unplanned failover between the primary storage site and the secondary storage site that causes switching of the primary role and the secondary role between the primary storage site and the secondary storage site is prevented in this primary bias state.

2. The computer-implemented method of claim 1, further comprising:

determining whether a primary storage cluster of the primary storage site receives a confirmation of the secondary storage cluster setting the primary bias state; and setting the primary bias state on the primary storage cluster when the primary storage cluster receives the confirmation.

3. The computer-implemented method of claim 1, further comprising:

waiting for a confirmation of the secondary storage cluster setting a primary bias state or receiving a rejection of the primary bias state if a mediator is configured and communicatively reachable from the secondary storage cluster.

4. The computer-implemented method of claim 2, further comprising:

detecting, with at least one of a primary storage cluster of the primary storage site and the secondary storage cluster, configuration of a mediator; and establishing, with the primary storage cluster, the secondary storage cluster, and the mediator, a three way quorum including updating a relationship state to the mediator and clearing the primary bias state on the primary storage cluster and the secondary storage cluster.

5. The computer-implemented method of claim 1, wherein setting the primary bias state comprises a first process that is atomic to ensure that only one process executes on the primary storage cluster or the secondary storage cluster at a time, wherein clearing the primary bias state comprises a second process that is atomic to ensure that only one process executes on the primary storage cluster or the secondary storage cluster at a time.

6. The computer-implemented method of claim 5, wherein for each process, a processing instance increments a generation number stored in a replicated database and caches a value of the generation number in memory of each storage cluster, wherein configuration for the negotiated primary bias state is updated only if the value of the generation number in memory matches a generation number in the replicated database during an update.

7. The computer-implemented method of claim 1, wherein the primary bias state and a mediator-less failover between the primary and secondary storage sites are mutually exclusive to each other.

8. The computer-implemented method of claim 1, further comprising:

detecting a failover being initiated by a third party monitoring solution between a primary storage cluster of the primary storage site and the secondary storage cluster;

removing the bi-directional synchronous replication relationship between the the first group of one or more storage members of the primary storage site and the the second group of one or more storage members of the secondary storage site upon detecting the failover of the third party monitoring solution; and unmapping one or more logical unit numbers for the one or more storage members of the secondary storage site based upon removing the bi-directional synchronous replication relationship between the first group of one or more storage members and the second group of one or more storage members.

9. A multi-site storage system comprising:

one or more processing resources; and a non-transitory computer-readable medium coupled to the one or more processing resources, having stored therein instructions, which when executed by the one or more processing resources cause the one or more processing resources to:

detect whether a bi-directional synchronous replication relationship exists between a first group of one or more storage members of a primary storage site and a second group of one or more storage members of a secondary storage site to allow simultaneous read-write access to both of a primary copy of data of the first group of the one or more storage members of the primary storage site initially having a primary role for serving input/output (I/O) operations and a secondary copy of the data of the second group of the one or more storage members of the secondary storage site initially have a secondary role for serving I/O operations when an existing mediator is being unconfigured with the mediator located remotely from the primary storage site and remotely from the secondary storage site; and negotiating a primary bias state and setting the primary bias state on a secondary storage cluster of the secondary storage site upon the bi-directional synchronous replication relationship being detected when the existing mediator is unconfigured, wherein planned or unplanned failover between the primary storage site and the secondary storage site that causes switching of the primary role and the secondary role between the primary storage site and the secondary storage site is prevented in this primary bias state.

10. The multi-site storage system of claim 9, wherein the instructions when executed by the one or more processing resources cause the one or more processing resources to:

determine whether a primary storage cluster of the primary storage site receives a confirmation of the secondary storage cluster setting the primary bias state; and set the primary bias state on the primary storage cluster when the primary storage cluster receives the confirmation.

11. The multi-site storage system of claim 10, wherein the instructions when executed by the one or more processing resources cause the one or more processing resources to:

detect, with at least one of a primary storage cluster of the primary storage site and the secondary storage cluster, configuration of a mediator; and establish, with the primary storage cluster, the secondary storage cluster, and the mediator, a three way quorum including updating a relationship state to the mediator and clearing the primary bias state on the primary storage cluster and the secondary storage cluster.

12. The multi-site storage system of claim 9, wherein setting the primary bias state comprises a first process that is atomic to ensure that only one process executes on a primary storage cluster or the secondary storage cluster at a time, wherein clearing the primary bias state comprises a second process that is atomic to ensure that only one process executes on the primary storage cluster or the secondary storage cluster at a time.

13. The multi-site storage system of claim 12, wherein for each process, a processing instance increments a generation number stored in a replicated database and caches a value of the generation number in memory of each storage cluster, wherein configuration for the negotiated primary bias state is updated only if the value of the generation number in memory matches a generation number in the replicated database during an update.

14. The multi-site storage system of claim 9, wherein the primary bias state and a mediator-less failover between the primary and secondary storage sites are mutually exclusive to each other.

15. The multi-site storage system of claim 9, wherein the instructions when executed by the one or more processing resources cause the one or more processing resources to:

detect a failover being initiated by a third party monitoring solution between a primary storage cluster of the primary storage site and the secondary storage cluster;

remove the bi-directional synchronous replication relationship between the the first group of one or more storage members of the primary storage site and the the second group of one or more storage members of the secondary storage site upon detecting the failover of the third party monitoring solution; and unmap one or more logical unit numbers for the one or more storage members of the secondary storage site based upon removing the bi-directional synchronous replication relationship between the first group of one or more storage members and the second group of one or more storage members.

16. A non-transitory computer-readable storage medium embodying a set of instructions, which when executed by one or more processing resources of a multi-site storage system cause the one or more processing resources to:

detect whether bi-directional synchronous replication relationship exists between a first group of one or more storage members of a primary storage cluster of a primary storage site and a second group of one or more storage members of a secondary storage cluster of a secondary storage site to allow simultaneous read-write access to both of a primary copy of data of the first group of the one or more storage members of the primary storage site initially having a primary role for serving input/output (I/O) operations and a secondary copy of the data of the second group of the one or more storage members of the secondary storage site initially have a secondary role for serving I/O operations when an existing mediator is being unconfigured with the mediator located remotely from the primary storage site and remotely from the secondary storage site; and negotiating a primary bias state and setting the primary bias state on a secondary storage cluster of the secondary storage site upon the bi-directional synchronous replication relationship being detected for when the existing mediator is unconfigured.

17. The non-transitory computer-readable storage medium of claim 16, wherein the instructions when executed by the one or more processing resources cause the one or more processing resources to:

set the primary bias state on the primary storage cluster;

detect, with at least one of a primary storage cluster of the primary storage site and the secondary storage cluster, configuration of a mediator; and establish, with the primary storage cluster, the secondary storage cluster, and the mediator, a three way quorum including updating a relationship state to the mediator and clearing the primary bias state on the primary storage cluster and the secondary storage cluster.

18. The multi-site storage system of claim 16, wherein setting the primary bias state comprises a first process that is atomic to ensure that only one process executes on the primary storage cluster or the secondary storage cluster at a time, wherein clearing the primary bias state comprises a second process that is atomic to ensure that only one process executes on the primary storage cluster or the secondary storage cluster at a time.

19. The multi-site storage system of claim 16, wherein the primary bias state and a mediator-less failover between the primary and secondary storage sites are mutually exclusive to each other.

20. The multi-site storage system of claim 16, wherein the instructions when executed by the one or more processing resources cause the one or more processing resources to:

detect a failover being initiated by a third party monitoring solution between a primary storage cluster of the primary storage site and the secondary storage cluster;

remove the bi-directional synchronous replication relationship between the the first group of one or more storage members of the primary storage site and the the second group of one or more storage members of the secondary storage site upon detecting the failover of the third party monitoring solution; and unmap one or more logical unit numbers for the one or more storage members of of the secondary storage site based upon removing the bi-directional synchronous replication relationship between the first group of one or more storage members and the second group of one or more storage members.

* * * * *